United States Patent
Kokusho et al.

(10) Patent No.: US 7,640,344 B2
(45) Date of Patent: Dec. 29, 2009

(54) METHOD AND APPARATUS FOR ESTIMATING COMPUTING RESOURCES IN A DISTRIBUTED SYSTEM, AND COMPUTER PRODUCT

(75) Inventors: Yasuhiro Kokusho, Kawasaki (JP); Satoshi Tsuchiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 561 days.

(21) Appl. No.: 11/412,846

(22) Filed: Apr. 28, 2006

(65) Prior Publication Data

US 2007/0162584 A1    Jul. 12, 2007

(30) Foreign Application Priority Data

Jan. 10, 2006  (JP)  ............................... 2006-002928

(51) Int. Cl.
*G06F 15/173* (2006.01)
(52) U.S. Cl. ..................................................... 709/226
(58) Field of Classification Search ................. 709/226; 718/104, 105
See application file for complete search history.

(56) References Cited

U.S. PATENT DOCUMENTS

| | | | | |
|---|---|---|---|---|
| 5,675,797 A | * | 10/1997 | Chung et al. ................. | 718/104 |
| 6,654,780 B1 | * | 11/2003 | Eilert et al. ................. | 718/104 |
| 7,228,546 B1 | * | 6/2007 | McCarthy et al. ........... | 718/104 |
| 7,310,672 B2 | * | 12/2007 | Rolia .......................... | 709/226 |
| 2004/0111509 A1 | * | 6/2004 | Eilam et al. ................. | 709/224 |

FOREIGN PATENT DOCUMENTS

| | | |
|---|---|---|
| JP | 2002-24192 | 1/2002 |
| JP | 2005-293048 | 10/2005 |

* cited by examiner

*Primary Examiner*—David Y Eng
(74) *Attorney, Agent, or Firm*—Staas & Halsey LLP

(57) ABSTRACT

In a resource plan creating apparatus and method, a resource plan is created based on a compatibility value between a task and computer hardware and a performance value acquired by an acquiring unit. An estimated load fluctuation value of each service tree is detected from an estimation waveform of load fluctuation of each service tree and an optimizing process is executed using the compatibility value and the estimation waveform of load fluctuation.

12 Claims, 25 Drawing Sheets

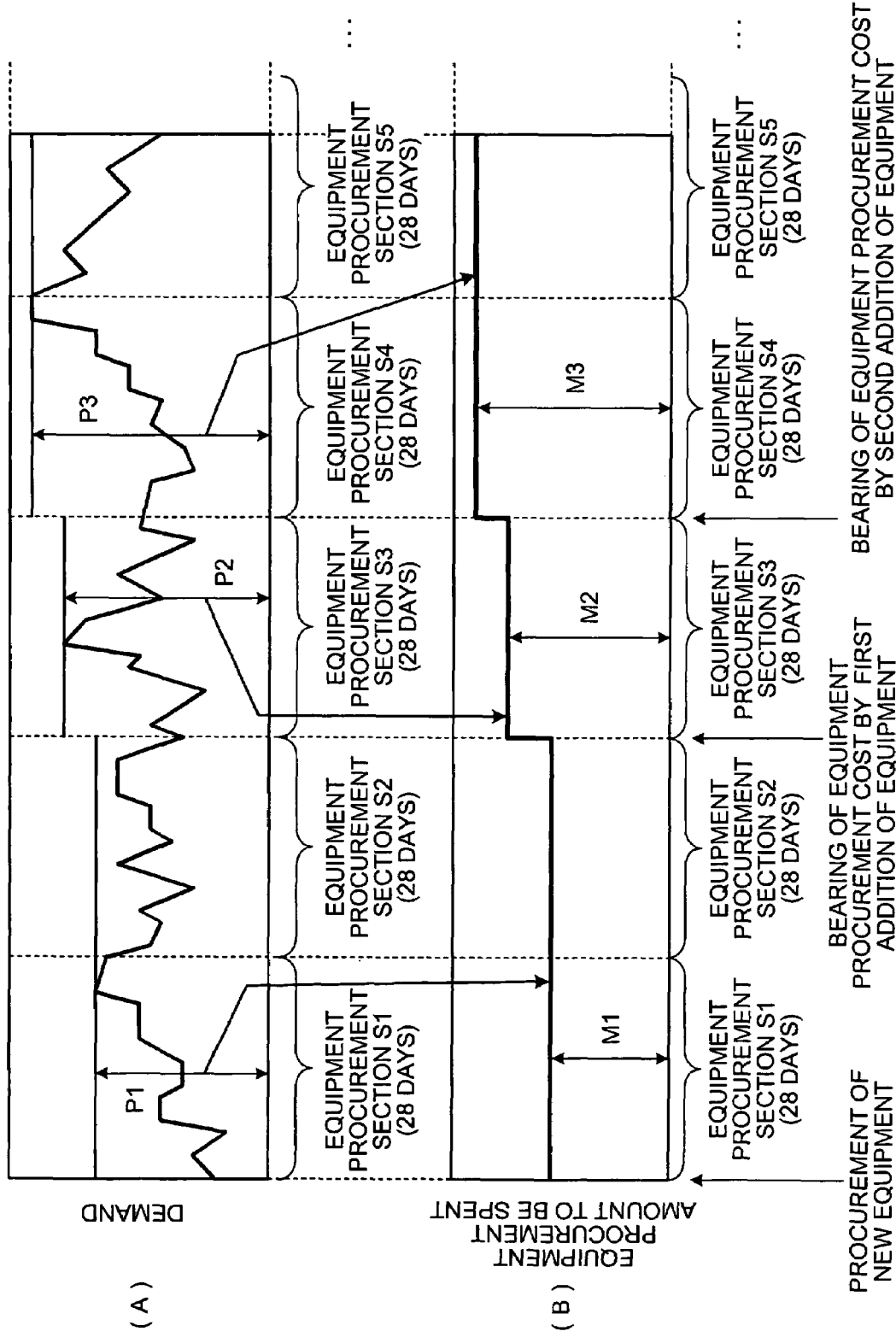

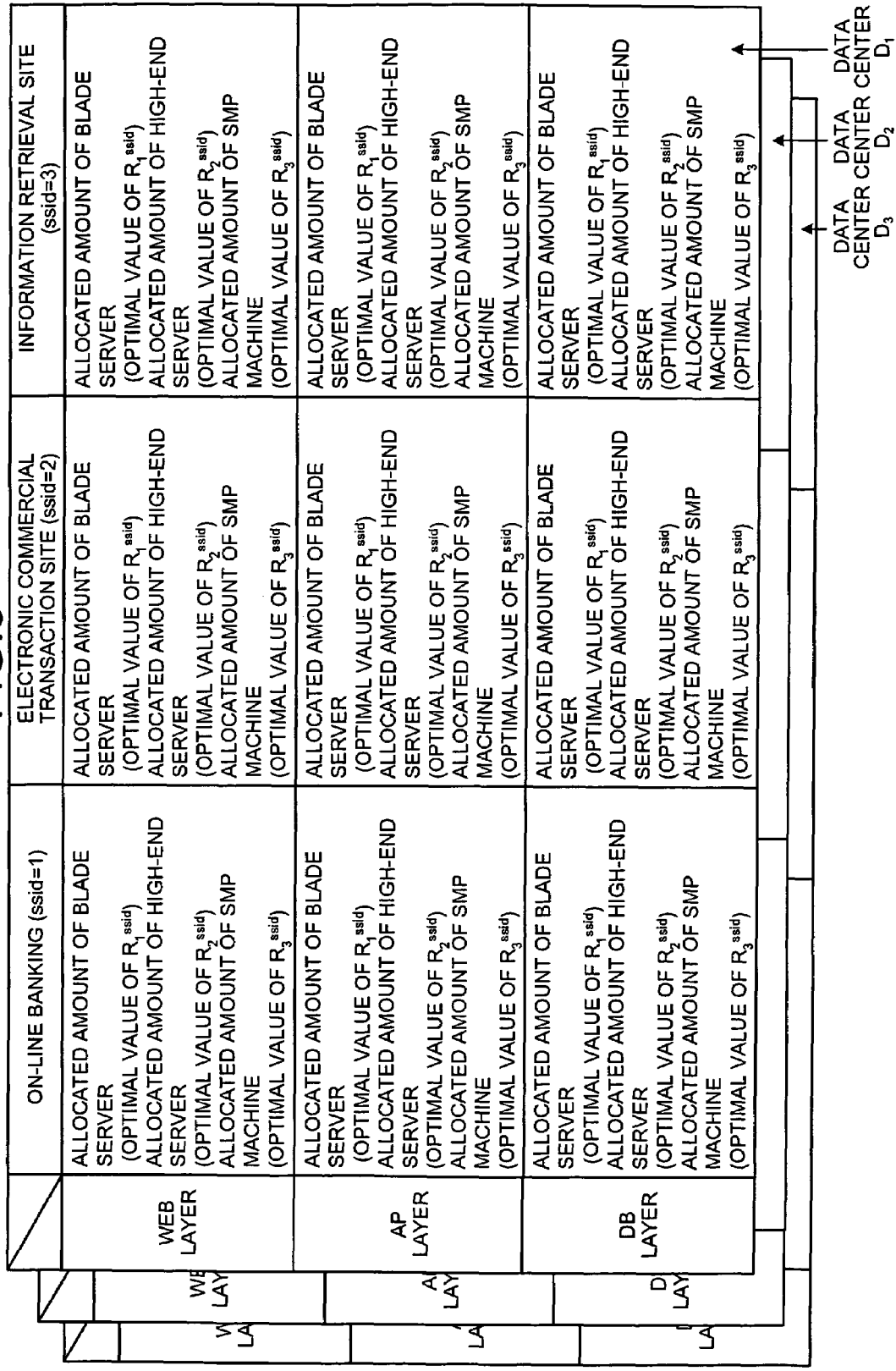

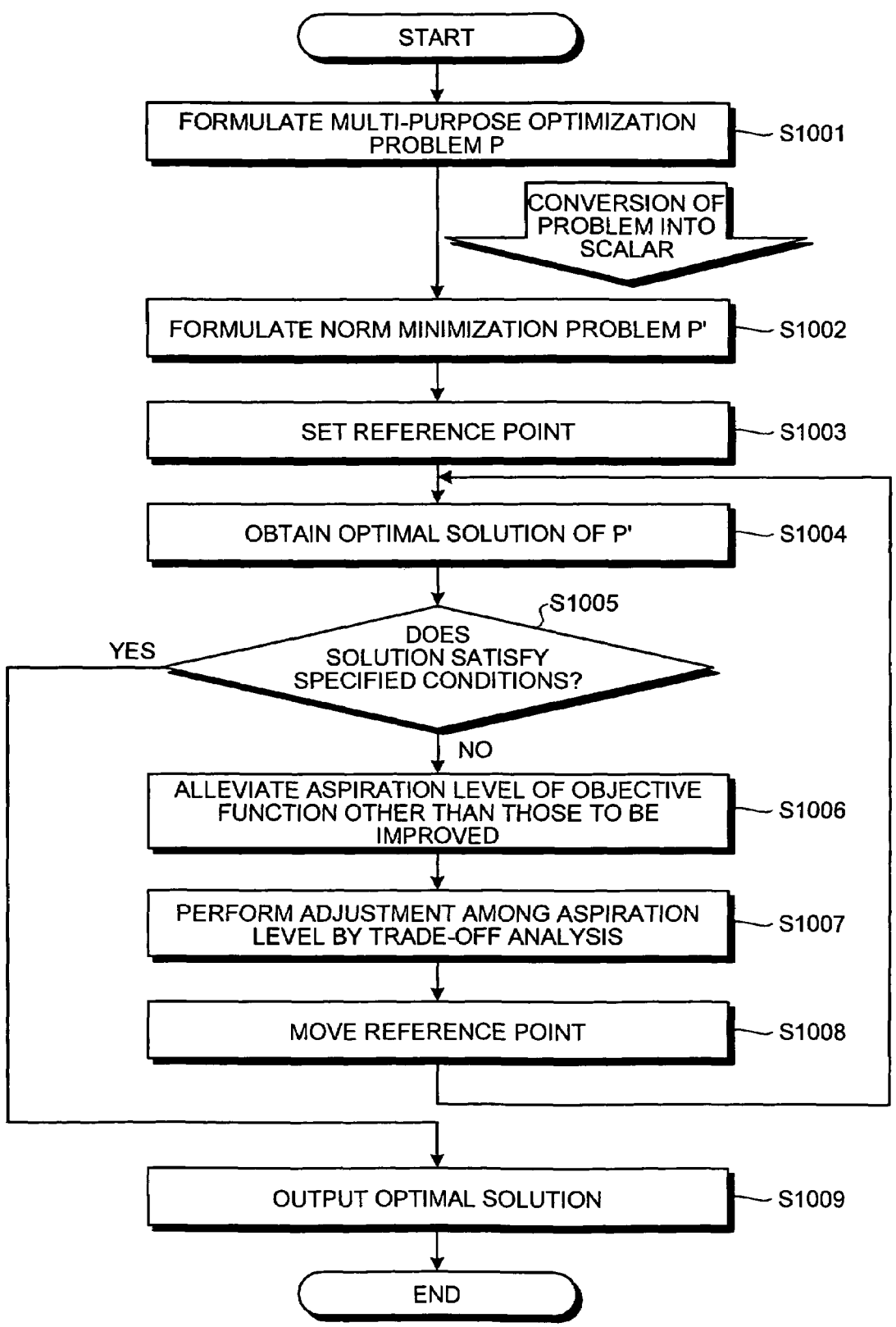

FIG.11

FORMULATION OF MULTI-PURPOSE OPTIMIZATION PROBLEM minimize $f(x)$ subject to $x \in \{x \in R^n \mid g(x) \leq 0\}$ $f(x) = [f_1(x), \cdots, f_p(x)]^T$ ← ARRANGEMENT OF OBJECTIVE FUNCTIONS $g(x) = [g_1(x), \cdots, g_m(x)]^T$ ← ARRANGEMENT OF CONSTRAINT EQUATIONS $x = [x_1, \cdots, x_n]^T$ ← ARRANGEMENT OF DETERMINING VARIABLES

FIG.12

NORM MINIMIZATION PROBLEM

$$\min_{x,z} \quad z + \alpha \sum_{i=1}^{p} \omega_i \left( f_i(x) - \bar{f}_i^{\,k} \right)$$

subject to $\omega_i \left( f_i(x) - \bar{f}_i^{\,k} \right) \leq z, \quad i = 1, \cdots, p$ $x \in \{x \in R^n \mid g(x) \leq 0\}$ $\bar{f}_i$ IS kTH SETTING VALUE OF LONGING LEVEL OF $f_i(x)$ HOW TO OBTAIN WEIGHTING COEFFICIENT $\omega_i$ OF NORM MINIMIZATION PROBLEM $$\omega_i = \frac{1}{f_{i*} - f_i^*}$$

$f_i^* = \min_{x \in X} f_i(x) \quad i = 1, \cdots, p$ $f_{i*} = \max_{1 \leq j \leq p} f_i(x_j^*)$ $x_j^* = f_j^{-1}(y)$ where $y = \min_{x \in X} f_j(x)$

α IS SUFFICIENTLY SMALL REAL NUMBER WITHIN RANGE IN WHICH COMPUTER CAN EXPRESS

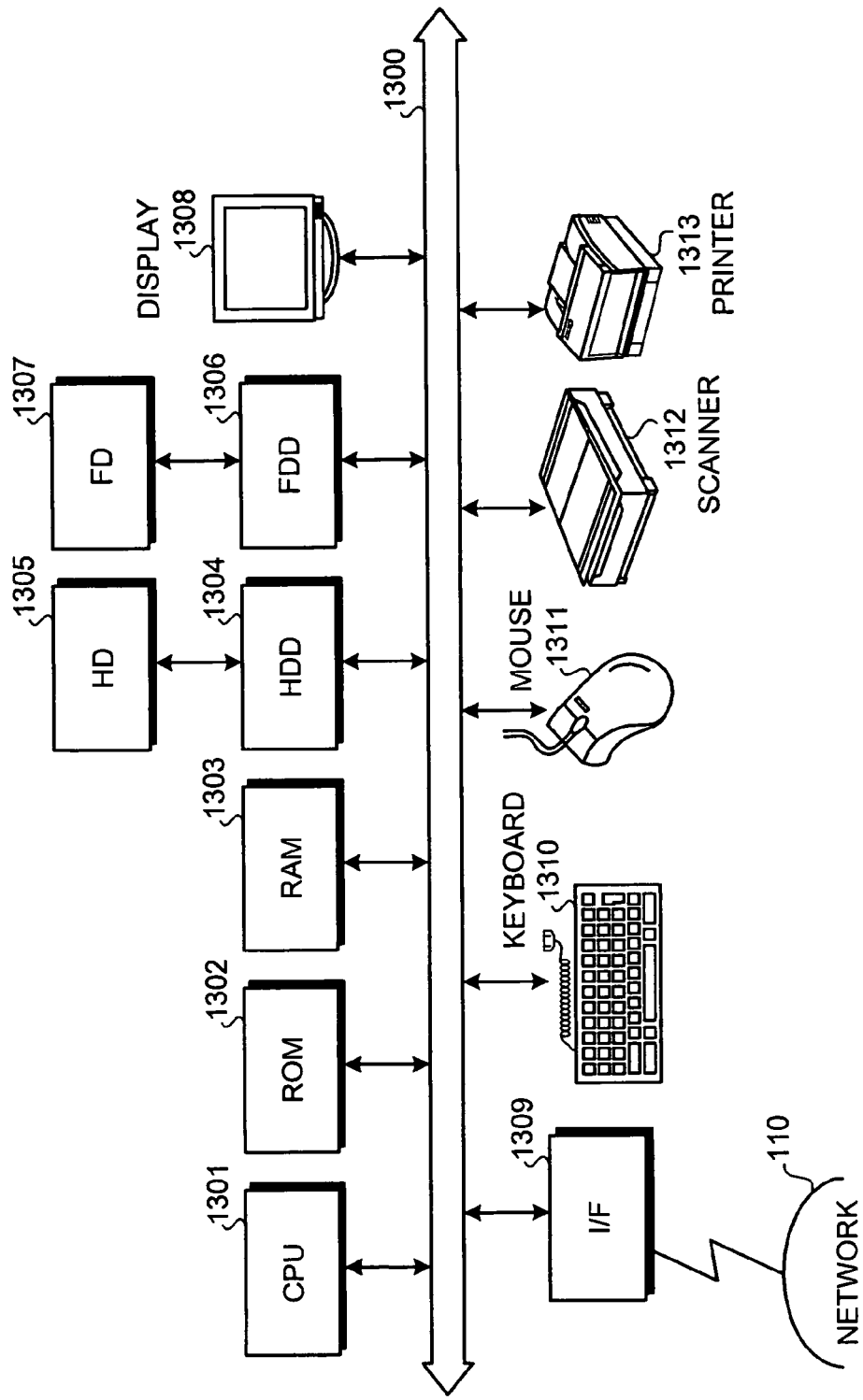

RESULT OF RESOURCE PLAN OF DATA CENTER $D_1$

RESULT OF RESOURCE PLAN OF DATA CENTER $D_2$

METHOD AND APPARATUS FOR ESTIMATING COMPUTING RESOURCES IN A DISTRIBUTED SYSTEM, AND COMPUTER PRODUCT

CROSS-REFERENCE TO RELATED APPLICATIONS

This application is based upon and claims the benefit of priority from the prior Japanese Patent Application No. 2006-002928, filed on Jan. 10, 2006, the entire contents of which are incorporated herein by reference.

BACKGROUND OF THE INVENTION

1. Field of the Invention

The present invention relates to a technology for estimating computing resources in a distributed Internet data center (DIC) system.

2. Description of the Related Art

Recently, plural network services for which operation have been consigned by plural service providers are operated simultaneously in a single data center. A resource allocation control is executed based on a utility scheme in which, among services operated simultaneously, an allocation amount of a computing resource is dynamically increased for a service that has an increasing load, and an allocation amount of a computing resource is dynamically decreased for a service that has a decreasing load (for example, Japanese Patent Application Laid-Open Publication No. 2002-24192).

However, when some of the services operated in a data center are temporarily over-loaded and the amount of resources to be allocated to those services needs to be significantly increased, idle resources to be additionally allocated can lack in the data center and the addition of resources may be impossible.

To prevent such a situation, a peak load in the data center is estimated, and resources are always prepared in an amount necessary at the peak load. The peak load is a peak amount of the total loads of all operation services in the data center. However, in this case, except at the peak load, most of the resources are not used and left to be idle resources. Thus, cost performance and efficiency in use of computing resources are degraded in the data center.

Therefore, in Japanese Patent Application Laid-Open Publication No. 2005-293048, a resource plan creating program is disclosed that creates an optimal disposition plan of a plurality of services to a plurality of data centers to prevent over-loading on the data centers and to improve efficiency of computing resources of the data centers.

According to a resource plan creating program disclosed in Japanese Patent Application Laid-Open Publication No. 2005-293048, when loads of some data centers among data centers connected through a wide area network and linked with each other have respectively reach peak values, a portion of the peak loads of the data centers is transferred to other data centers that have light loads. A service in which the transferred loads are processed is referred to as "derivative service" and a service that is originally operated before the portion of the loads is transferred is referred to as "primitive service".

Thus, a control scheme in which the amount of loads at the peak time in plural data centers are reduced is disclosed, and optimization of load distribution ratios between primitive services and derivative services at the time of load transfer for each network service is executed.

The resource plan creating program in Japanese Patent Application Laid-Open Publication No. 2005-293048 realizes the optimization of a resource plan by realizing the optimal division of the load in which an optimal percentage of the load at the peak time in an estimation waveform of load fluctuation of a specific network service is cut out, and disposition optimization in which a derivative load cut out is optimally disposed.

FIG. 22 is a schematic for illustrating an effect of an action of the resource plan creating program disclosed in Japanese Patent Application Laid-Open Publication No. 2005-293048. In FIG. 22, graphs 2201 to 2203 are graphs showing waveforms of estimated load fluctuation of data centers $D_1$ to $D_3$ that provide network services A to C before the optimization processes are performed.

Graphs 2211 to 2213 shown in FIG. 22 are graphs showing waveforms of estimated load fluctuation of the data centers $D_1$ to $D_3$ after the optimization processes. In each of the graphs 2201 to 2203 and 2211 to 2213, a horizontal axis represents time. The left end thereof indicates the present and the right end thereof indicates one year later. The vertical axis represents the amount of load.

Before the optimization process, as shown in the graph 2201, the peak value of the load amount of the data center $D_1$ is "F". After the optimization process, as shown in the graph 2211, a peak portion Pa in the graph 2201 is divided as a derivative load and is transferred to the data center $D_3$ while incorporating a peak portion Pb in the graph 2202 as a derivative load. Thus, the peak amount of the load amount of the data center DC1 is decreased to "f".

Before the optimization process, as shown in the graph 2202, the peak value of the load amount of the data center $D_2$ is "G". After the optimization process, as shown in the graph 2212, the peak portion Pb in the graph 2202 is divided as a derivative load and is transferred to the data center $D_1$ while incorporating a peak portion Pc in the graph 2203 as a derivative load. Thus, the peak value of the load amount of the data center $D_2$ is decreased to "g".

Before the optimization process, as shown in the graph 2203, the peak value of the load amount of the data center $D_3$ is "H". After the optimization process, as shown in the graph 2213, the peak portion Pc in the graph 2203 is divided as a derivative load and is transferred to the data center $D_2$ while incorporating the peak portion Pa as a derivative load. Thus, the peak value of the load amount of the data center $D_3$ is decreased to "h".

As shown in FIG. 22, according to the resource plan creating program disclosed in Japanese Patent Application Laid-Open Publication No. 2005-293048, based on the estimation waveform of load fluctuations respectively for network services A to C for one year from now on, optimization of the load distribution ratio between the primitive services and the derivative services of the peak load amount at each time of the peak occurrence when the network services A to C are operated in each of the plurality of data centers $D_1$ to $D_3$ linked with each other.

As described above, according to the resource plan creating program disclosed in Japanese Patent Application Laid-Open Publication No. 2005-293048, optimization of the load distribution ratio is executed for the necessary resource amounts at the peak time of the data centers $D_1$ to $D_3$ such that the peak reduction rate that represents a ratio of a value before and a value after the optimization process becomes as large as possible. Peak reduction rates PRR1 to PRR3 of the data centers $D_1$ to $D_3$ are expressed in the following Equations i to iii.

$$PPR1=(F-f)/F \quad \text{(i)}$$

$$PPR2=(G-g)/G \quad \text{(ii)}$$

$$PPR3=(H-h)/H \quad \text{(iii)}$$

Thus, the amounts of computing resources that the data centers $D_1$ to $D_3$ should respectively prepare in advance can be minimized and the efficiency in use of the computing resources and the cost performance can be improved. In the optimization of this load distribution ratio, it is empirically known that the peak reduction rates PRR1 to PRR3 can be maximized when the load amounts of the data centers $D_1$ to $D_3$ after the optimization are always as equal as possible.

The load distribution ratio obtained as described above at each time of peak occurrence and data centers of optimal destinations to which the derivative services are disposed that are arranged in the time sequence of the peak, based on an estimation waveform of load fluctuation for future one year is referred to as "resource plan". To obtain a resource plan that maximizes the peak reduction rate is referred to as "optimization of the resource plan".

According to this resource plan creating program, with the optimization of the resource plan, the prepared amount in a center of the resources in the data center $D_1$ can be reduced to f (<F); the prepared amount in a center of the resources in the data center $D_2$ can be reduced to g (<G); and the prepared amount in a center of the resources in the data center $D_3$ can be reduced to h (<H).

However, in the conventional technique of the above Japanese Patent Application Laid-Open Publication No. 2005-293048, it is assumed that all of the computer hardware in the data centers $D_1$ to $D_3$ is uniform and has no difference in type, and the computing resources demand amount per one transaction of each task (a program that is being executed and that executes functions provided by the network services A to C on the computer hardware) that executes each of the network services A to C in the data center $D_1$ to $D_3$ is uniform.

In practice, in the data centers $D_1$ to $D_3$, various types of computer hardware having different computer hardware architectures, such as a blade server, a high-end server, a symmetric multiple processor (SMP), etc., are present, and the computing resources demand amount per one transaction differs depending on tasks to execute the network services.

Therefore, achievable processing performance may differ between a case where a task is executed on a blade server and a case where the same task is executed on an SMP machine even when the task executes the same information retrieving service and both of the blade server and the SMP machine respectively have the same computer hardware performance values. The necessary computer hardware performance values to achieve the processing performance of one transaction per second may differ depending on the type of task. Therefore, a resource plan optimized without considering such a context can not always be practical, and the plan cannot be applied to the real data centers $D_1$ to $D_3$.

As a result, an operator of the data centers $D_1$ to $D_3$ cannot make any outlook for a long-term equipment investment plan as to how many computing resources in the data centers $D_1$ to $D_3$ should be added at which point in the future, or how much the estimated amount of the equipment procurement cost for the addition will be.

Therefore, making a long-term equipment investment plan that copes with the peak time is necessary. However, most of the computing resources are not used except at the peak time, and the plan results in wasteful equipment investment and increased equipment cost.

SUMMARY OF THE INVENTION

It is an object of the present invention to at least solve the above problems in the conventional technologies.

A computer-readable recording medium according to one aspect of the present invention stores therein a computer program for realizing a method of creating a resource plan. The computer program makes a computer execute acquiring a performance value indicative of a performance of each of a plurality of types of computer hardware in each data center that constitutes a distribution system, the performance when performing a task selected from among a plurality of types of tasks relating to a network service operated by the distribution system; calculating a compatibility value indicative of compatibility of a predetermined type of computer hardware with the task based on the performance value, the predetermined type of computer hardware selected from among the types of computer hardware; and creating a resource plan of the distribution system based on the compatibility value.

An apparatus for creating a resource plan according to another aspect of the present invention includes an acquiring unit configured to acquire a performance value indicative of a performance of each of a plurality of types of computer hardware in each data center that constitutes a distribution system, the performance when performing a task selected from among a plurality of types of tasks relating to a network service operated by the distribution system; a calculating unit configured to calculate a compatibility value indicative of compatibility of a predetermined type of computer hardware with the task based on the performance value, the predetermined type of computer hardware selected from among the types of computer hardware; and a creating unit configured to create a resource plan of the distribution system based on the compatibility value.

A method of creating a resource plan according to still another aspect of the present invention includes acquiring a performance value indicative of a performance of each of a plurality of types of computer hardware in each data center that constitutes a distribution system, the performance when performing a task selected from among a plurality of types of tasks relating to a network service operated by the distribution system; calculating a compatibility value indicative of compatibility of a predetermined type of computer hardware with the task based on the performance value, the predetermined type of computer hardware selected from among the types of computer hardware; and creating a resource plan of the distribution system based on the compatibility value.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a graph of estimated equipment procurement costs;

FIG. 5 is a schematic of output data obtained by optimization in each time slot;

FIG. 10 is a flowchart of multi-purpose optimization using the aspiration level method;

FIG. 11 is a schematic for illustrating formulation of a multi-purpose optimization problem P;

FIG. 12 is a schematic for illustrating formulation of a norm minimization problem P';

FIG. 13 is a schematic of a resource plan creating apparatus according to the embodiment;

DETAILED DESCRIPTION OF THE PREFERRED EMBODIMENTS

Exemplary embodiments according to the present invention will be explained in detail below with reference to the accompanying drawings.

Figure 1:
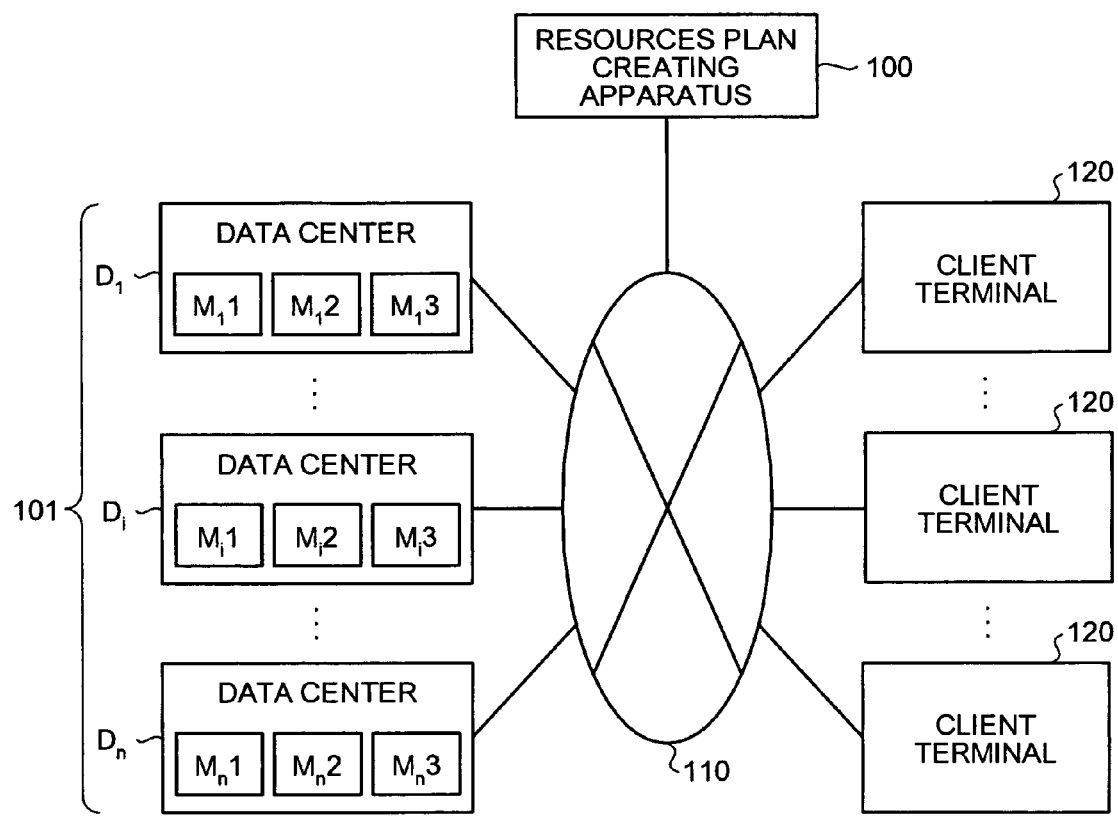
FIG. 1 is a schematic of a distribution IDC system according to an embodiment of the present invention.

FIG. 1 is a schematic of a distributed IDC system according to an embodiment of the present invention. A distributed IDC system 101 includes plural data centers $D_1$ to $D_n$ connected through a network 110. The distributed IDC system 101 provides a network service in response to a request from a client terminal 120. Each data center $D_i$ (i=1 to n) is constituted of plural types (three types in an example shown in FIG. 1) of computer hardware $M_i$mt (for example, mt=1 to 3).

"mt" represents a computer hardware type. For example, computer hardware $M_i1$ for which mt=1 is a blade server; computer hardware $M_i2$ for which mt=2 is a high-end server; and computer hardware $M_i3$ for which mt=3 is an SMP machine.

A resource plan creating apparatus 100 is connected with the distributed IDC system 101 through the network 110 and creates a resource plan of the distributed IDC system 101. The functions of the resource plan creating apparatus 100 may be present inside the distributed IDC system 101 or the data centers $D_1$ to $D_n$.

The resource plan creating apparatus 100 prevents each data center $D_i$ from being over-loaded while estimating how many computer resources in the data centers will be necessary at which points in the future and how much the procurement cost for those computer resources will amount. Thus, the computing resources in the data center $D_i$ can be efficiently used and a necessary long-term equipment investment plan for the distributed IDC system 101 in the future can be estimated.

The resource plan creating apparatus 100 according to the embodiment newly introduces a concept of compatibility and a concept of a weight of a task. The assumption necessary for describing the concept of the compatibility and a concept of the weight of a task will be described. In the embodiment, the basic precondition is that the following assumption almost holds in a real data center environment.

Figure 2A:
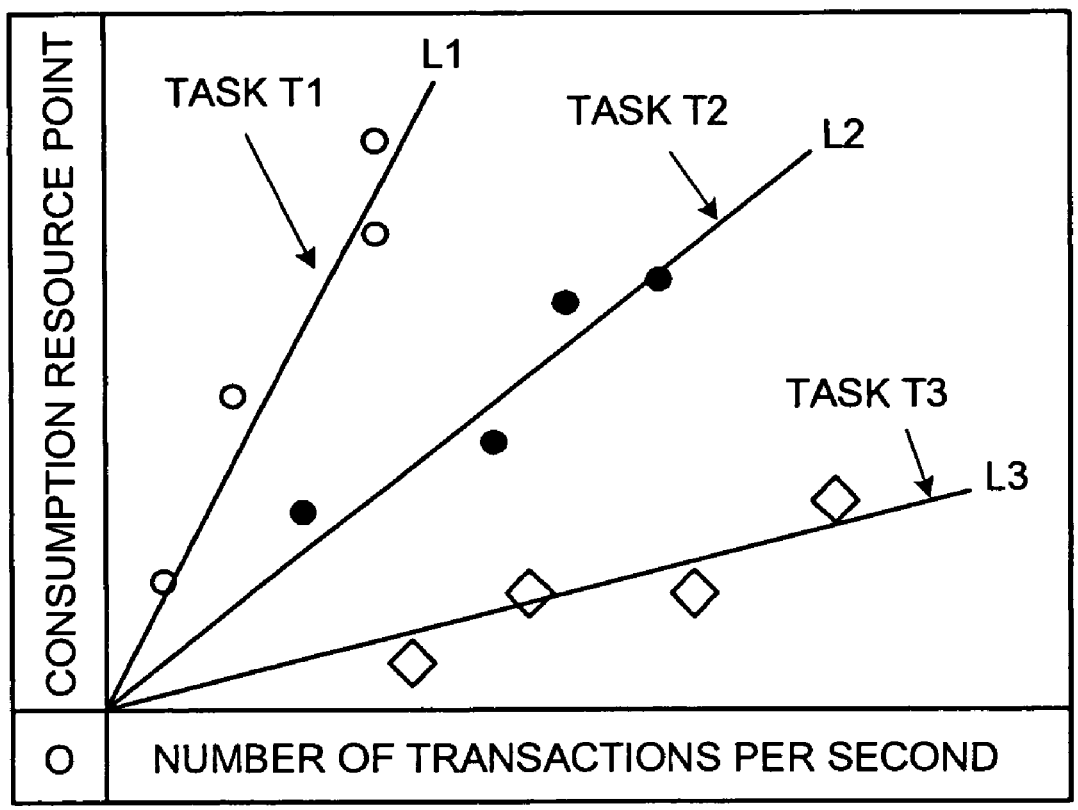
FIG. 2A is a graph showing a relation between number of transactions per second of each task and a consumption resource point.

FIG. 2A is a graph showing a relation between number of transactions per second of tasks T1 to T3 and consumption resource point, where the number of transactions per second on a horizontal axis represents the number of arrivals of user requests (request from a client terminal 120) per second, and the consumption resource point on the vertical axis represents the computing resource amount (amount of computing resources consumed) that is consumed by the tasks T1 to T3 to process the user requests. For example, 100 megahertz (MHz) of a central-processing-unit (CPU) clock number of each computer hardware $M_i$mt is defined as one resource point.

For the tasks T1 to T3, as shown in FIG. 2A, the disposition of the plots can be approximated roughly by straight lines L1 to L3 that cross the origin O. That is, the relation between the number of arrivals of the user requests per second and the computing resources consumed amount can be approximated roughly by a proportional relation. This is a first assumption.

Figure 2B:
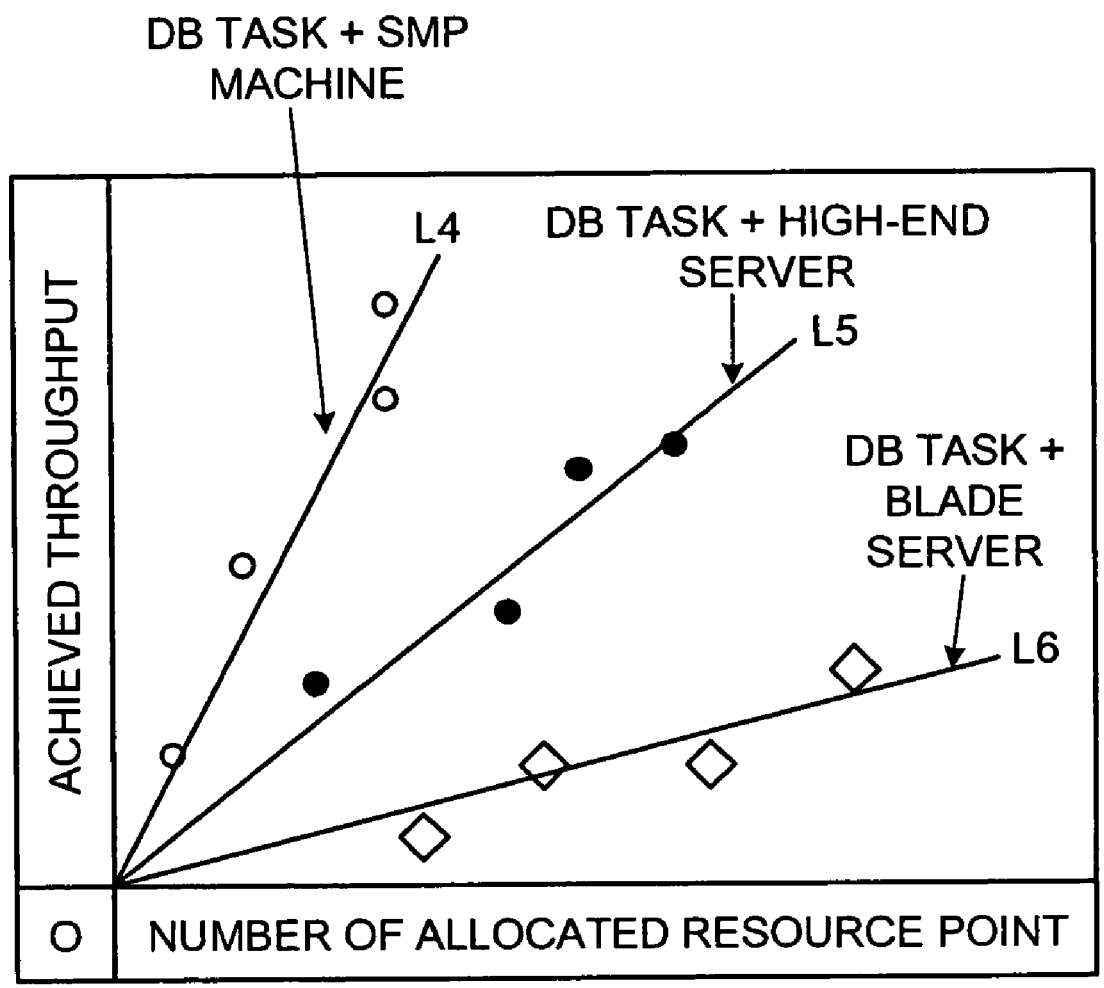
FIG. 2B is a graph showing a relation between number of allocated resource point of a task and an achieved throughput.

FIG. 2B is a graph showing a relation between the number of allocated source points of a task (for example, a DB task) and an achieved throughput, where the number of allocated source points is the computing resources amount (allocated computing resources amount) for each computer hardware $M_i$x allocated for execution of the task and, for example, 100 MHz of the CPU clock number of each computer hardware $M_i$mt is defined as one resource point, and the achieved throughput is an achievable processing performance value obtained when a task (for example, a DB task) is allocated to and executed on some computer hardware $M_imt$.

As an example herein, as to the DB task, the relations between the number of allocated resource points and the achieved throughput is plotted for the three cases of the case where only a blade server is allocated, the case where only a high-end server is allocated, and the case where only an SMP machine is allocated, as the computer hardware $M_ix$ for executing the DB task.

As to the above cases, the disposition of the plots can be approximated roughly by straight lines L4 to L6 that cross the origin O. That is, as to the above cases, the allocated computing resources amount and the achieved throughput can be approximated by a proportional relation as well as, because the slope of each approximating straight line is different respectively for the above cases, the proportional coefficient for the proportional relation between the number of the allocated resource points and the achieved throughput differs depending on which type of task is executed on the computer hardware $M_imt$. This is a second assumption. The slopes of the approximating straight lines L4 to L6 represent the compatibility of each computer hardware type with the DB task.

Figure 2C:
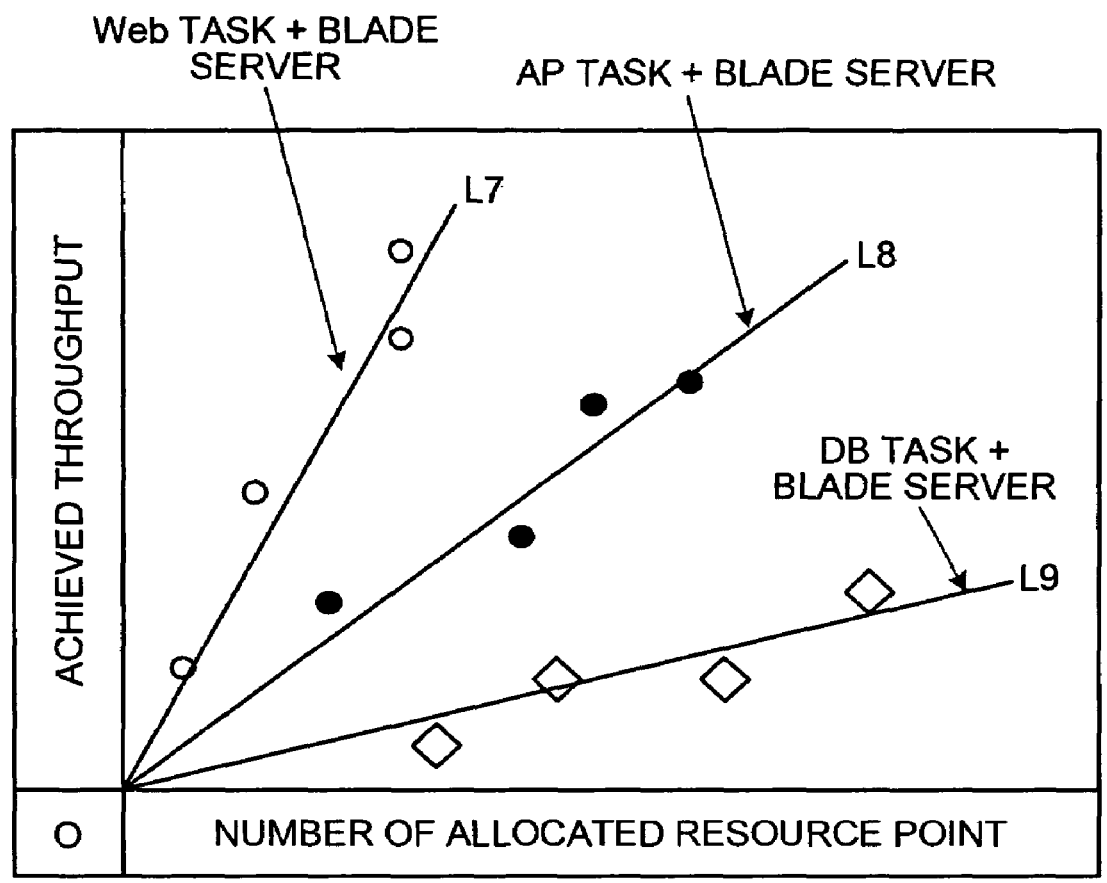
FIG. 2C is a graph showing a relation between number of allocated resource point and an achieved throughput obtained when the same type of computer hardware is allocated for execution of three different types of tasks.

FIG. 2C is a graph showing the relation between the number of the allocated resource points and the achieved throughput obtained when the same type of computer hardware $M_ix$ is allocated for execution of three different-type tasks. That is, the number of the allocated resource points and the achieved throughput obtained when the same type of computer hardware $M_imt$ (for example, a blade server) is allocated for execution of three different-type tasks (a web server task, an AP server task, and the DB task) are plotted. The definitions of the number of the allocated resource points and the achieved throughput are same as those for FIG. 2B.

As to the above cases, similarly to the second assumption, plotted points can be approximated by straight lines L7 to L9 respectively for the cases and the slopes of the approximating straight lines L7 to L9 differ respectively for the cases. That is, an assumption that the relation between the number of the allocated resource points and the achieved throughput is a proportional relation for each of the cases and the proportional relation differs depending on the type of task that is executed, is the third assumption. The slopes of the approximating straight lines L7 to L9 represent the compatibility for each type of task with the blade server.

Based on the above first to third assumptions, the compatibility between a task and computer hardware $M_ix$ that executes the task is defined as follows. As to the compatibility between one specific type of task and one specific type of computer hardware, a value obtained by dividing a processing performance value obtained when the task executed on the specific type of computer hardware $M_imt$ having a level of CPU performance, by the maximal value of the processing performance values obtained when the same task is executed on various types of computer hardware $M_imt$ having the same level of the CPU performance, as the denominator, is defined as the compatibility.

For example, when three types: a blade server (computer hardware $M_ia$), a high-end server (computer hardware $M_ib$), and an SMP machine (computer hardware $M_ic$) are available as the types of computer hardware, and it is assumed that, when the same task is executed on the above three types of computer hardware $M_ia$, $M_ib$, $M_ic$ respectively having the same machine performance, the maximal processing performance is obtained by the execution on the SMP machine. Therefore, the compatibility between the task and the blade server is a value obtained by dividing the processing performance value obtained when the task is executed on the blade server by the processing performance value obtained when the task is executed on the SMP machine as the denominator.

That is, according to the above second assumption, that "the CPU performance per one piece of computer hardware $M_imt$ is same among the three types of computer hardware $M_ia$, $M_ib$, $M_ic$ that execute the same task" can be regarded as that the allocated amounts of the computing resources to the task is equal. In this case, the achievable processing performances must differ due to the difference between the slopes of the approximating straight lines L4 to L6 shown in FIG. 2B. Therefore, the relative ratio of the difference in the slopes of the approximating straight lines L4 to L6 can be quantified as the compatibility.

Therefore, in the case of this example, if the compatibility between a task and a blade server is "0.5", only a half of the processing performance obtained when this task is executed on an SMP machine having the same level of CPU performance can be obtained when the task is executed on the blade server. On the other hand, the allocated computing resources amount necessary for a specific task to achieve a level of processing performance depends on not only the compatibility between the type of the task and the type of the computer hardware but also the task-specific properties.

That is, as shown in FIG. 2A, the computing resources amount necessary for processing a task at a rate of one user request per second (transaction per second) for each type of task differs by task type. Therefore, to estimate the computing resources amount necessary for achieving a level of processing performance (consumed resource point) for the task, not only the compatibility but also the task-specific value relating to the computing resources consumed amount per user request per second need to be considered.

The task-specific value is referred to as "weight of task" in this embodiment and is represented by the slopes of the approximating straight lines L1 to L3 in the graph of FIG. 2A. That is, the slopes of the approximating straight lines L1 to L3 are defined as the computing resources amounts having the best compatibility value, that a specific type of task consumes to process per user request per second.

The basic configuration of the optimization of a resource plan realized by this embodiment will be described. The optimization of a resource plan described in the above '3048 application only divides the time axis into time slots and optimizes, for each time slot, the load distribution ratio between the primitive services and the derivative services, and the data centers to be disposed with the derivative services.

That is, in the '3048 application, for each of the plurality of network services operated in the plurality of data centers linked with each other through the wide-area network, a estimation waveform of load fluctuation is inputted by the operation administrator and the height of a wave of the estimation waveform of load fluctuation at a time t is taken out every time period t corresponding to each time slot on the time axis, for each network service and is determined to be the load amount of the network service at the time t. The load amount of each network service at the time t is divided optimally into primitive services and derivative services and is disposed optimally such that the peak reduction rates PRR1 to PRR3 described above become maximum.

In the optimization of the resource plan in the embodiment, in addition to the load distribution ratio of the primitive services and the derivative services and the optimization of the data center $D_i$ that is to be disposed to, a plurality of consecutive time slots are grouped in equipment procurement sections. For each of the equipment procurement sections, the necessary amount of the computing resources amount in the data center for load peak times in the section and an estimated amount of the costs for procuring the necessary amount of the computing resources amount are calculated, are lined up in the order of the equipment procurement sections, and outputted in the time sequence.

As a result, according to the embodiment, the operator of the data center $D_i$ can estimate not only how each network service should be optimally divided into primitive services and derivative services, be disposed in a plurality of data centers $D_1$ to $D_n$, and be operated at each time t in the future, but also how many computing resources should be added in the data center $D_i$ at which time point in the future and how much the estimated amount of the equipment procurement costs at that time. Therefore, an owner of the data center $D_i$ can also obtain an outlook of a long-term equipment investment plan.

FIGS. 3A and 3B are graphs of estimated equipment procurement costs. FIG. 3A is a graph showing a variation over time of demand of computer hardware $M_i$mt, and FIG. 3B is a graph showing a variation over time of the equipment procurement amount. The graph of FIG. 3B varies following the variation of the demand in FIG. 3A. In FIGS. 3A and 3B, each horizontal axis is a time axis. FIG. 3B is a graph that has plots of equipment procurement amounts corresponding to peak values in each equipment procurement section of values plotted in the graph of FIG. 3A.

When a procurement cost has been born by a first equipment addition after procuring new equipment, corresponding to a peak value P1 of the demand in sections to the bearing of the equipment procurement cost by the first equipment addition (equipment procurement sections S1, S2), an equipment procurement amount M1 for the same sections in FIG. 3B can be estimated in advance in FIG. 3A.

When a procurement cost has been born by a second equipment addition after the bearing of the procurement cost by the first equipment addition, corresponding to a peak value P2 of the demand in a section to the bearing of the procurement cost by the second equipment addition (equipment procurement sections S3), an equipment procurement amount M2 for the same section in FIG. 3B can be estimated in advance in FIG. 3A.

After the procurement cost has been born by the second equipment addition (equipment procurement sections S4, S5 . . . ), corresponding to a peak value P3 of the demand in FIG. 3A, an equipment procurement amount M3 for the same section in FIG. 3B can be estimated in advance.

The additional amounts of the data center computing resources (see FIG. 3A), the addition timings, and the equipment procurement amounts (see FIG. 3B) are optimized such that the equipment procurement costs are minimized while the throughput of the data center $D_i$ is maximized. To execute the optimization of the resource plan, an optimization problem needs to be configured and the optimal solution thereof needs to be obtained such that an optimal value can be obtained for each of the following items for each time slot on the time axis.

How many computing resources should be allocated to each task?

What is the mixing ratio of the computing resources to be allocated to each task, for each type of computer hardware?

A distribution ratio for distributing the load amount of each network service at the time t corresponding to a time slot, into tasks that execute primitive services and tasks that execute derivative services.

To configure the optimization problem as above, the objective functions (the first objective function to the fourth objective function) for the optimization problem will be defined.

[First Objective Function]

A function obtained by totaling for all task values respectively indicating how relatively sufficient computing resources are allocated (herein after, "(allocation) satisfying rate of the resources demand amount") to a resources demand amount of each task determined by the number of user requests per second (the number of transactions per second) that arrive at the task.

[Second Objective Function]

A function obtained by obtaining the total value of equipment procurement costs of all the computing resources in the data center $D_i$ by weighting and totaling the unit price of every type of computer hardware $M_i$mt for all the computing resources in the data center $D_i$.

[Third Objective Function]

A function obtained by obtaining the level of how sufficient the retained amount of the computing resources of the entire data center $D_i$ is to the load amount of the entire data center $D_i$ for each data center $D_i$ and obtaining the magnitude of the dispersion of the value obtained above between the data centers $D_i$, $D_j$ (j≠i).

[Fourth Objective Function]

A value that indicates quantitatively for each network service, how much the load distribution ratio of the primitive services and the derivative services fits to the desire of customers and how much the data center $D_i$ to be disposed with the primitive services and the derivative services fits to the desire of the customers.

The optimal solution that optimizes simultaneously all of the first objective function to the fourth objective function is obtained. The first objective function and the fourth objective function are objective functions for maximization. The second objective function and the third objective function are objective functions for minimization. Because these objective functions generally are non-linear functions, the optimization problem is a multi-purpose non-linear optimization problem.

By executing simultaneously the maximization of the first objective function and the minimization of the second objective function, optimization of a resource plan is possible such that the equipment procurement costs of the computing resources in the data center $D_i$ are minimized while the total throughput of the data center $D_i$ is simultaneously maximized as much as possible.

Why the third objective function is minimized is that the minimization is based on an empirical rule that "the percentage of the total load amount in each data center that accounts for in the resources amount of the data center should be uniform among data centers to maximize the peak reduction rate by optimizing a resource plan" and the above minimization aims at maximizing the peak reduction rate of the data center $D_i$.

The forth objective function is defined considering the following circumstances. For example, a customer who consigns operation of a network service may desire that "among a plurality of data centers $D_i$ to $D_n$, a primitive service is operated in a data center $D_i$ that is geographically closest to an office of the company of the customer, and the load amount of a derivative service divided from the primitive service should be minimized as much as possible". When the optimization of the resource plan is executed, the fourth objective function is defined based on a policy that optimization that satisfies such desire of the customer as much as possible in addition to the optimization of the first objective function to the third objective function, should be executed.

As a specific definition of the above first objective function, the following can be preferably considered. The resources demand amount of the task described in the definition of the first objective function is defined as a product of the number of user requests per second that arrive at the task, and the "weight of a task" described above, that is, the computing resources amount consumed to process one user request by the task.

The allocated amount of the computing resources to the task is defined as a value obtained by weighting the CPU performance of each computer hardware $M_i$mt by the value of the compatibility between the type of the computer hardware and the type of the task for a group of computer hardware $M_i$mt that execute the task and totaling the obtained values.

The value of the first objective function is defined as a rate of allocated amount of the computing resources according to the above definition for the tasks, to the resources demand amount of the task according to the above definition. Why the definition of the computing resources allocated amount to the task is as above is that the achievable processing performance differs depending on the value of compatibility even when a same quantity of the computer hardware $M_i$mt having the same CPU performance is allocated, and it is necessary to take this into account in defining an effective value of the resources allocated amount.

In the optimization of the resource plan in the embodiment, optimization is executed for not only the distribution ratio of the primitive service and the derivative service of the load amount that arrive at the network service at each time in the future but also the distribution ratio for each computer hardware $M_i$mt as the unit. This optimization will be described later.

As a solution-finding method of the optimal solution of the multi-purpose non-linear optimization problem that optimizes simultaneously the four objective functions from the first objective function to the fourth objective function, for example, the aspiration level method can be considered. However, the solution can be obtained by other optimization algorithms based on Pareto theory.

The network services will be described with specific examples. Each network service operated in a plurality of data centers that is the target of the optimization of the resource plan is assumed to be a web service having a three-tier configuration consisting of a web layer, an AP layer, and a DB layer. This web service consisting of the three tiers is a network service to be optimized.

The web layer is a layer that has a role of receiving a user request from a client terminal 120 through an Http protocol, and returning a response in an XML format or an HTML format in the Http protocol to the user terminal.

The AP layer is a layer that receives a processing request specified for each user request from the web layer through an SOAP protocol, and executes an application logic provided by the web service. The DB layer is a layer that receives a data retrieval request by the SQL from the AP layer, and executes retrieval, etc., of a database on a storage by a database administration system.

To handle the web service having such three-tier configuration in the optimization of the resource plan, a task model as below is assumed. A service tree, a service flow, and a service section that are the three concepts constituting this task model will be described below.

A set of all tasks on all the data centers $D_i$ that respectively execute one same network service is referred to as "service tree", where the same network service is a service that is consigned the operation thereof by one same operation consigner and provides a service having the same content to users.

Figure 22:
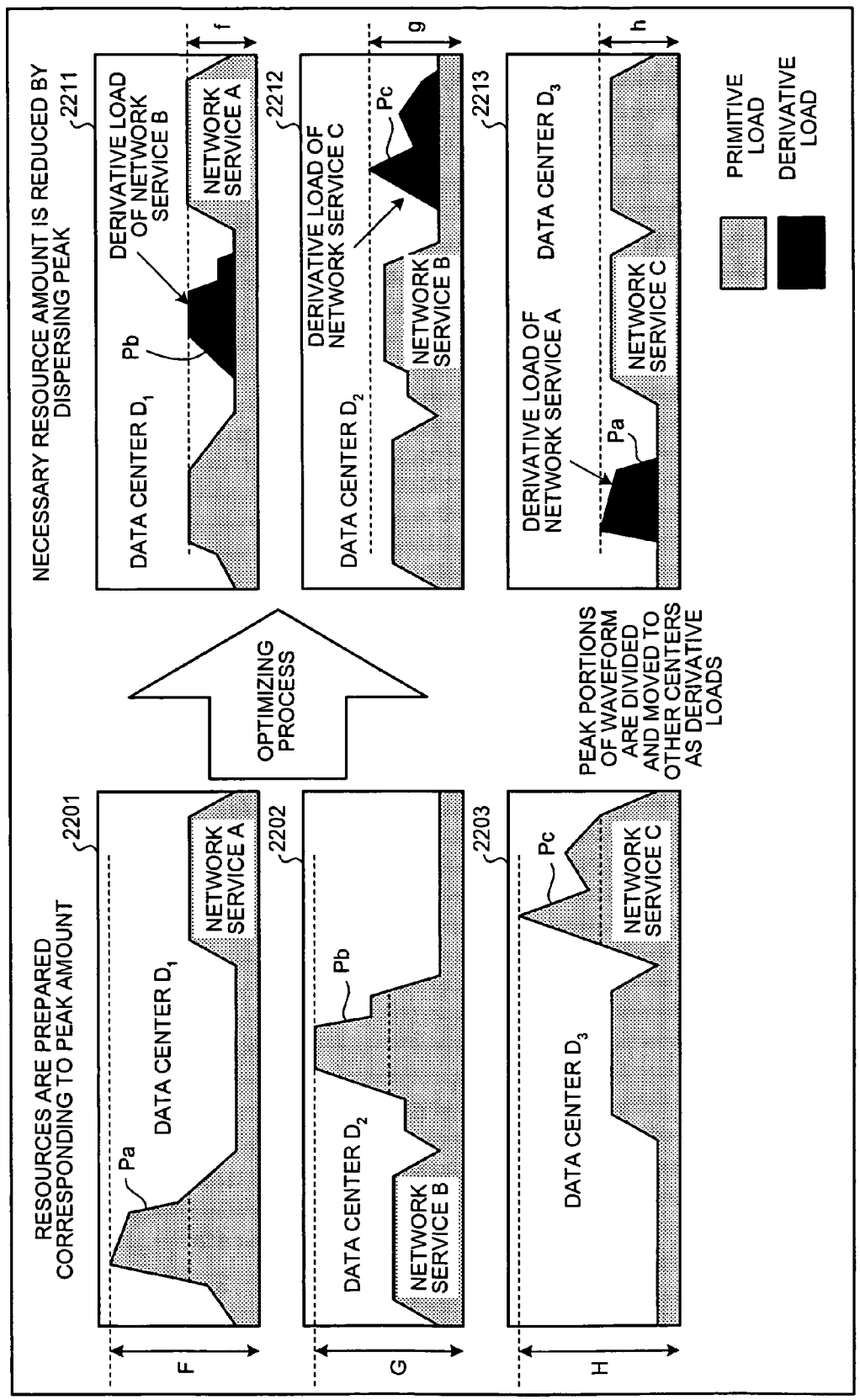
FIG. 22 is a schematic for illustrating an effect of an action of a resource plan creating program according to a technology disclosed in Japanese Patent Application Laid-Open Publication No. 2005-293048.

For example, the estimation waveform of load fluctuation of the data center $D_1$ that is shown in the graph 2201 of FIG. 22 is an estimation waveform of load fluctuation of a service tree relating to the network service A. The estimation waveform of load fluctuation of the data center $D_2$ that is shown in the graph 2202 is an estimation waveform of load fluctuation of a service tree relating to the network service B. The estimation waveform of load fluctuation of the data center $D_3$ that is shown in the graph 2203 is an estimation waveform of load fluctuation of a service tree relating to the network service C.

Figure 4A:
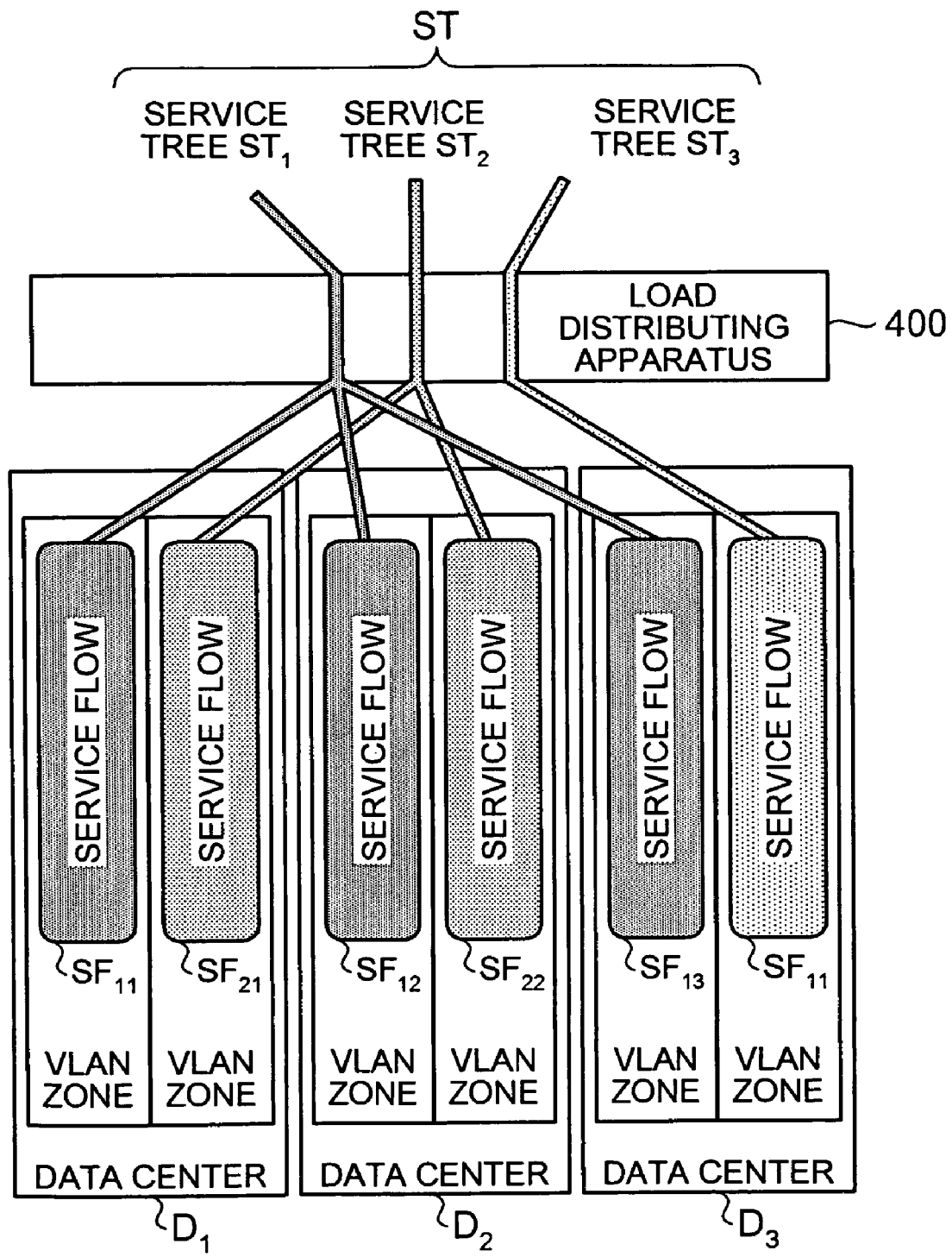
FIG. 4A is a schematic showing a relation between a service tree and a service flow.

FIG. 4A is a schematic showing a relation between a service tree and a service flow. In FIG. 4A, the relation between a service tree $ST_{stid}$ and a service flow $SF_{yk}$ is shown. In the service tree $ST_{stid}$, "stid" represents an identification number (in FIG. 4A, stid=1 to 3).

The service tree $ST_{stid}$ is identified uniquely by a combination of the content of the service to be provided (this is referred to as "service class" and has some types such as on-line banking, an information retrieval service, an electronic commercial transaction site, etc.) and an operation consigner. Therefore, the service tree $ST_{stid}$ is generally executed across the data centers $D_1$ to $D_3$.

On the other hand, a network services are divided by the optimization of the resource plan into a primitive service and a derivative service, distributed and disposed respectively to different data centers $D_i$. When, similarly to the network service, a group of tasks belonging to the same service tree $ST_{stid}$ is divided into a primitive service and a plurality of derivative services, distributed and disposed respectively to different data centers $D_i$, a set of tasks that are disposed to the same data center $D_i$, among the tasks belonging to the same service tree $ST_{stid}$, is referred to a service flow $SF_{yk}$.

In this service flow $SF_{yk}$, "y" corresponds to "sid" of the service tree $ST_{stid}$ and "k" represent a number for classification. The load amount that has arrived at the service tree $ST_{stid}$ is divided into the service flow $SF_{yk}$ at a specific ratio by a load distributing apparatus 400 that executes wide-area load distribution among the data centers $D_1$ to $D_3$.

For example, a service tree $ST_1$ is divided by the load distributing apparatus 400 into service flows $SF_{11}$ to $SF_{13}$ and the service flow $SF_{11}$ is distributed to the data center $D_1$, the service flow $SF_{12}$ is distributed to the data center $D_2$, and the service flow $SF_{13}$ is distributed to the data center $D_3$.

Figure 4B:
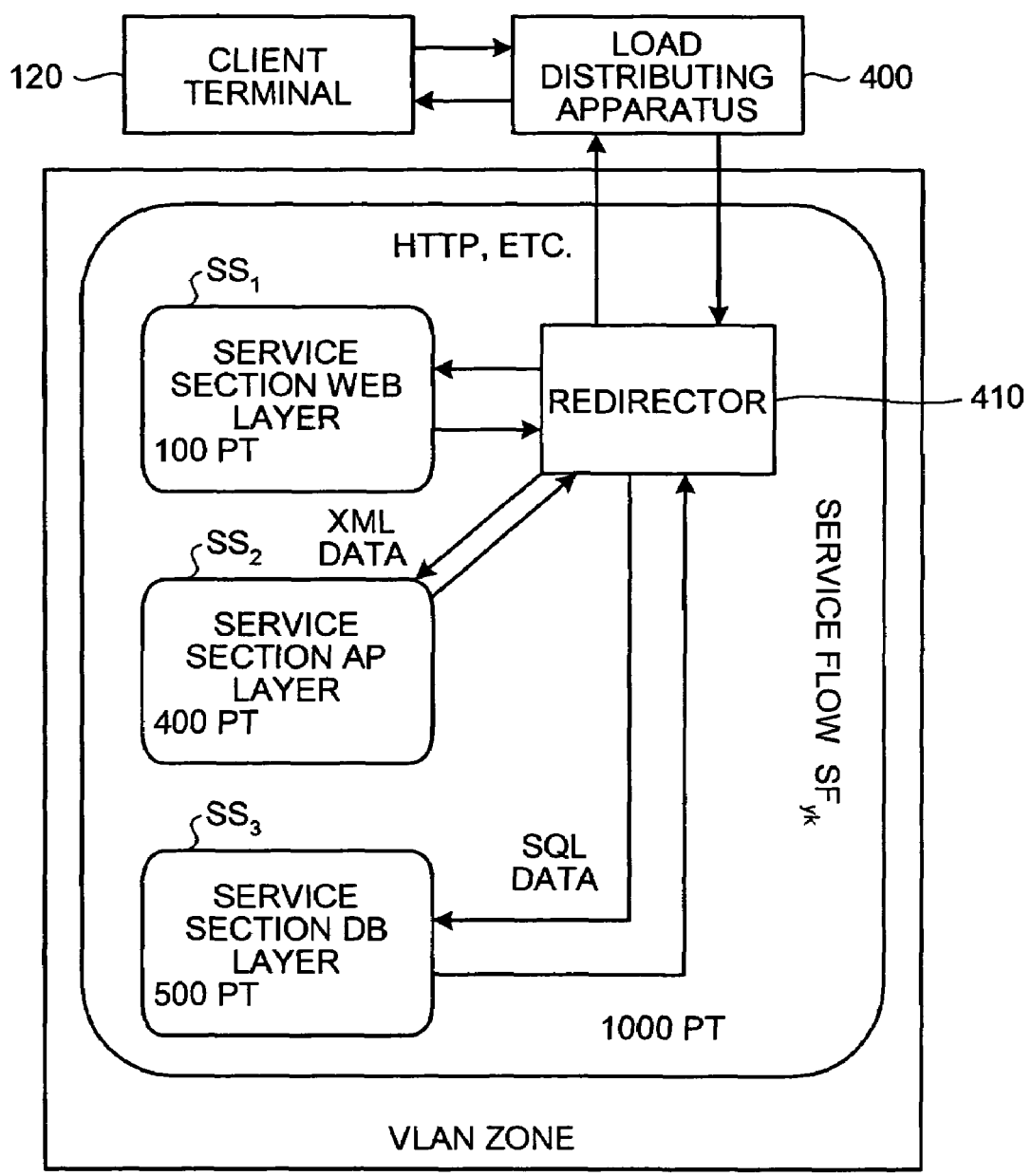
FIG. 4B is a schematic showing a relation between the service flow and a service section.

FIG. 4B is a schematic showing a relation between the service flow $SF_{yk}$ and the service section $SS_{ssid}$. Because the service flow $SF_{yk}$ on each data center $D_i$ has respectively an image of a web service of three-tier configuration, each service flow $SF_{yk}$ can be divided into the above-mentioned three tiers (the web layer, the AP layer, and the DB layer) and each layer of the above three-tier layers is executed respectively as a separate task.

This task that corresponds to each layer is referred to as a service section $SS_{ssid}$. In the service section $SS_{ssid}$, "ssid" is an identification number of the service section (in FIG. 4B, ssid=1 to 3). A task executed in the web layer is referred to as "service section $SS_1$". A task executed in the AP layer is referred to as "service section $SS_2$". A task executed in the DB layer is referred to as "service section $SS_3$".

The unique ratio by the load distributing apparatus 400 at each time point during operation can be obtained by the preliminary optimization of the resource plan. The load amount allocated to each service flow $SF_{yk}$ is assigned by a redirector 410 in each data center $D_1$ to $D_3$ to the service section $SS_1$ that corresponds to the web layer. In this case, it should be considered how the load amount allocated to each service flow $SF_{yk}$ is distributed among the service sections $SS_{ssid}$ constituting the service flow $SF_{yk}$.

In this case, it is assumed that the load amount of each service flow $SF_{yk}$ is distributed to service sections $SS_{ssid}$ by at a specific ratio that does not vary over time and is referred to as an inter-layer load distribution ratio Dist [stid, $ly_{ssid}$], and that the inter-layer load distribution ratio Dist [stid, $ly_{ssid}$] is determined uniquely for each service tree $ST_{stid}$.

Therefore, among the service flows $SF_{yk}$ belonging to the same service tree $ST_{stid}$, the inter-layer load distribution ratios Dist [stid, $ly_{ssid}$] to the service sections $SS_{ssid}$ are same among each other and does not vary over time. In the inter-layer load distribution ratios Dist [stid, $ly_{ssid}$], "$ly_{ssid}$" represents a layer ly (whether the web layer, the AP layer, or the DB layer) in which the task identified by the service section $SS_{ssid}$ is executed.

In the embodiment, for quantifying a load amount to a network service (the service tree $ST_{stid}$), the number of user requests that arrive per second is used. For quantifying the CPU performance of computer hardware $M_{imt}$, the clock speed of the CPU is used. For quantifying the achievable processing performance of a task, the number of requests that the task can process in one second, referred to as "throughput (processing performance value)", is used.

Items relating to the time axis will be described. It is assumed that an estimation waveform of load fluctuation of a service tree $ST_{stid}$ relating to network services from now for one year in the future is desired and the height of a wave of the load fluctuating estimating waveform of the service tree $ST_{stid}$ at a time t in the future is L[stid, t]

The height of a wave of the estimation waveform of load fluctuation is the average value per one day of the estimated number of the number of the user requests that arrive per one second. The time axis has a length corresponding to one year and the time axis is divided into 365 time slots respectively corresponding to each day constituting one year. The time slots are grouped every 28 slots in the order from a first slot in the sequential time slots. This group is referred to as "equipment procurement section".

Each time slot is correlated respectively with the time and the time is expressed by the month and the day. Therefore, when a corresponding time of a time slot is t, the average value per one day of the number of the user requests that arrive per one second of the service tree $ST_{stid}$ in the time slot is obtained to be L[stid, t] from the height of the wave of the estimation waveform of load fluctuation.

On the other hand, each task that executes each network service is one service section $SS_{ssid}$ and the compatibility between the task and the computer hardware $M_{i}$mt that executes the task is evaluated for each combination of each service section $SS_{ssid}$ and each piece of computer hardware $M_{i}$mt. However, the type of a task is determined uniquely by a combination of the above-mentioned service class and a layer. Therefore, when the service class and the layer are both belong to the same service section $SS_{ssid}$, the type of tasks are same though the identification symbol ssid is different.

The computing resources amount allocated to each task is quantified as a value obtained by totaling the respective CPU clock speeds relating to the computer hardware $M_{i}$mt group allocated for executing the task. In the embodiment, every 1 GHz of the CPU clock speed of the computer hardware $M_{i}$mt is represented by one point. For example, two pieces of computer hardware $M_{i}$mt having respectively the CPU clock speed of 2 GHz and 3 GHz are allocated, the allocated amount of the computing resources is quantified to be five points.

Based on this quantification, the allocated amount of the computing resources of the computer hardware $M_{i}$mt allocated to a task having an arbitrary service section $SS_{ssid}$ is represented as a determining variable $R_{mt}^{ssid}$. Therefore, this determining variable $R_{mt}^{ssid}$ exists for each combination of each service section $SS_{ssid}$ and each type mt of the computer hardware of the computer hardware $M_{i}$mt.

For example, as a result of the optimization of the resource plan, an output is obtained stating that the allocated amounts of the computing resources to one task specified by the service section $SS_{ssid}$ are three points for the blade server (mt=1), two points for the high-end server (mt=2), and five points for the SMP machine (mt=3), etc. That is, a plurality of different types of computer hardware $M_{i}$mt may be allocated to one task (service section $SS_{ssid}$).

The load amount L[stid, t] (the number of user request that arrive per second) of the service section $SS_{ssid}$ in a time slot corresponding to the time t is distributed to each service flow $SF_{yk}$ constituting the service tree $ST_{stid}$. However, the load amount distributed to the service flow $SF_{yk}$ disposed to the data centers $D_i$ is represented by L[stid, $D_i$]

Though the load amount L[stid, $D_i$] is a value that differs depending on the time t, the time "t" is not included in the subscripts for simplification of description. The load amount L[stid, $D_i$] is distributed to each service section $SS_{ssid}$ constituting the service flow $SF_{yk}$. However, when the inter-layer load distribution ratios Dist [stid, $ly_{ssid}$] relating to the layers ly (the web layer, the AP layer, and the DB layer) of the service tree $ST_{stid}$ are respectively 0.2, 0.3, and 0.5, the load amounts to be distributed to the service sections $SS_{ssid}$ respectively corresponding to each of the web layer, the AP layer, and the DB layer are respectively 0.2XL[stid, $D_i$], 0.3XL[stid, $D_i$], and 0.5XL[stid, $D_i$].

The load amount of a service section $SS_{ssid}$ is represented by a name of a variable, "$L_{ssid}$". The optimization of the resource plan in the embodiment is to solve an optimization problem described later for each time slot on the time axis with the estimation waveform of load fluctuation for each service tree $ST_{stid}$ as an input, and obtain the optimal values of the determining variable $R_{mt}^{ssid}$ and the load amount L[stid, $D_i$] for all the service sections $ST_{ssid}$, computer hardware $M_{i}$mt, and the data centers $D_i$ for each time slot.

That is, the optimization is to determine the optimal load distribution to each service flow $SF_{yk}$ of each service tree $ST_{stid}$, and the optimal distribution among different types mt of computer hardware relating to the load amount of each service section $SS_{ssid}$, at each time point in the future; and to obtain the least necessary equipment procurement amount that can secure a necessary throughput at each time point in the future. By obtaining the least necessary equipment procurement amount, how much equipment will need to be added at which time point in the future and how much the equipment procurement costs will be can be estimated.

Figure 6:
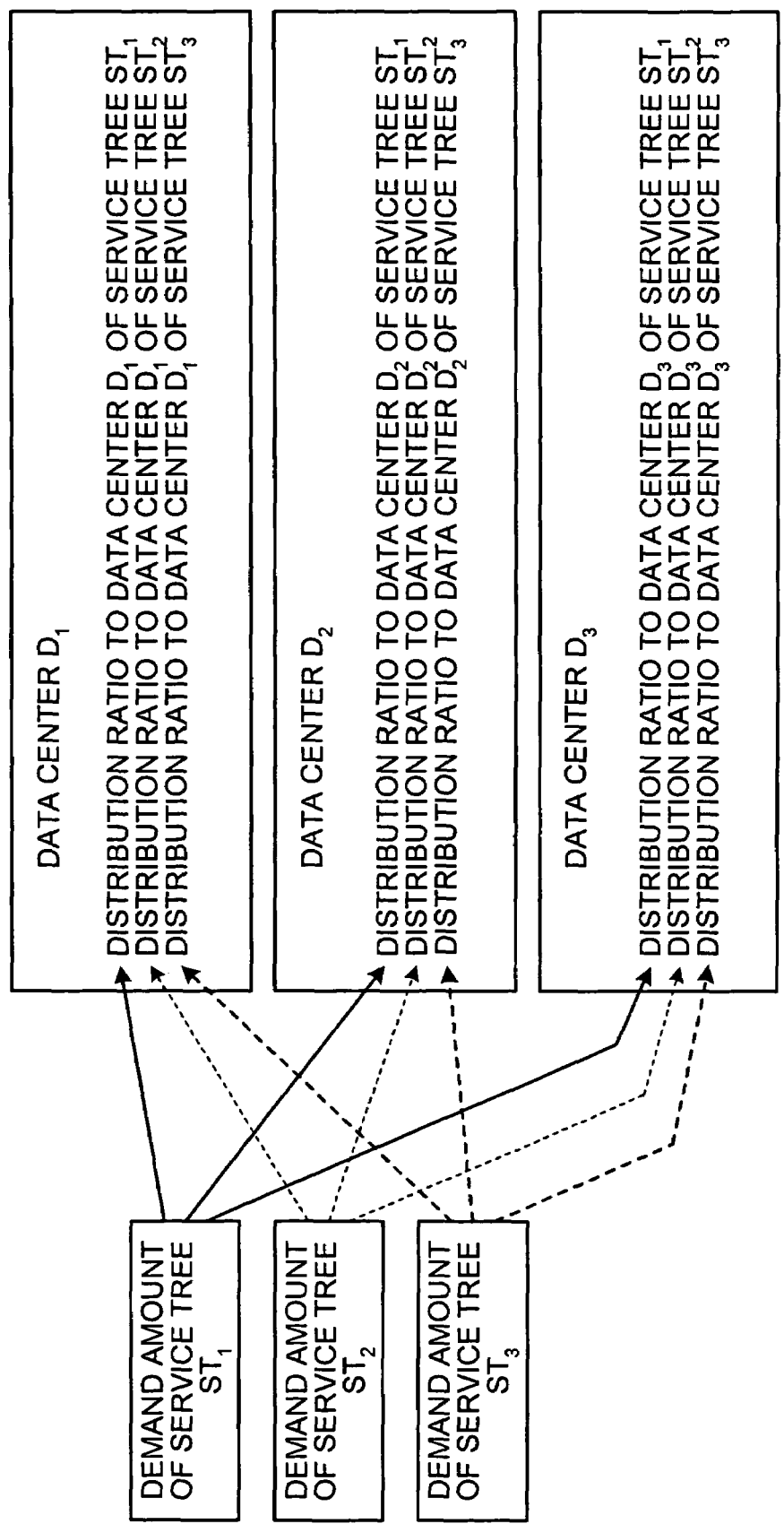
FIG. 6 is a schematic of output data obtained by optimization in each time slot.

FIGS. 5 and 6 are schematics of output data obtained by the optimization at each time slot. Because which type mt of computer hardware of the computer hardware $M_{i}$mt should be allocated for each task respectively with how many points is determined by the optimization at each time slot, the output data shown in FIG. 5 are the output data obtained by totaling those points for each type of task.

For each service tree $ST_{stid}$, the allocation of the load amounts to service flows $SF_{yk}$ constituting the service tree $ST_{stid}$ is determined by the optimization for each time slot. The output data shown in FIG. 6 are output data obtained by converting the allocation (allocated amount) of the load amount into load mounts of the service trees $ST_{stid}$ based on the load distribution ratio of the derivative services to each data center $D_i$.

When the output data shown in FIG. 5 are totaled for the data centers $D_i$ for each type mt of the computer hardware, the necessary amount of equipment procurement for each type mt of the computer hardware and for each data center $D_i$ in the time slot is obtained. For all the time slots, this necessary amount of the equipment procurement is obtained for each type mt of the computer hardware and the obtained necessary amounts are lined up in the order of the time of the time slots to be in the time sequence, and the lined up amounts are referred to as "machine demand fluctuation waveform" of the data center $D_i$.

FIG. 3A shows a machine demand fluctuation waveform for a type mt of computer hardware in a data center $D_i$. The peak value in each equipment procurement section S1, S2, . . . of this machine demand fluctuation waveform is defined as the equipment amount that must be retained by the data center $D_i$ in the equipment procurement sections S1, S2, . . . and an output result (equipment procurement plan) having the above values taken respectively for all the equipment procurement sections S1, S2, . . . , that are lined up in the order for the equipment procurement section S1, S2, . . . to be in the time sequence is shown in FIG. 7.

Figure 7:
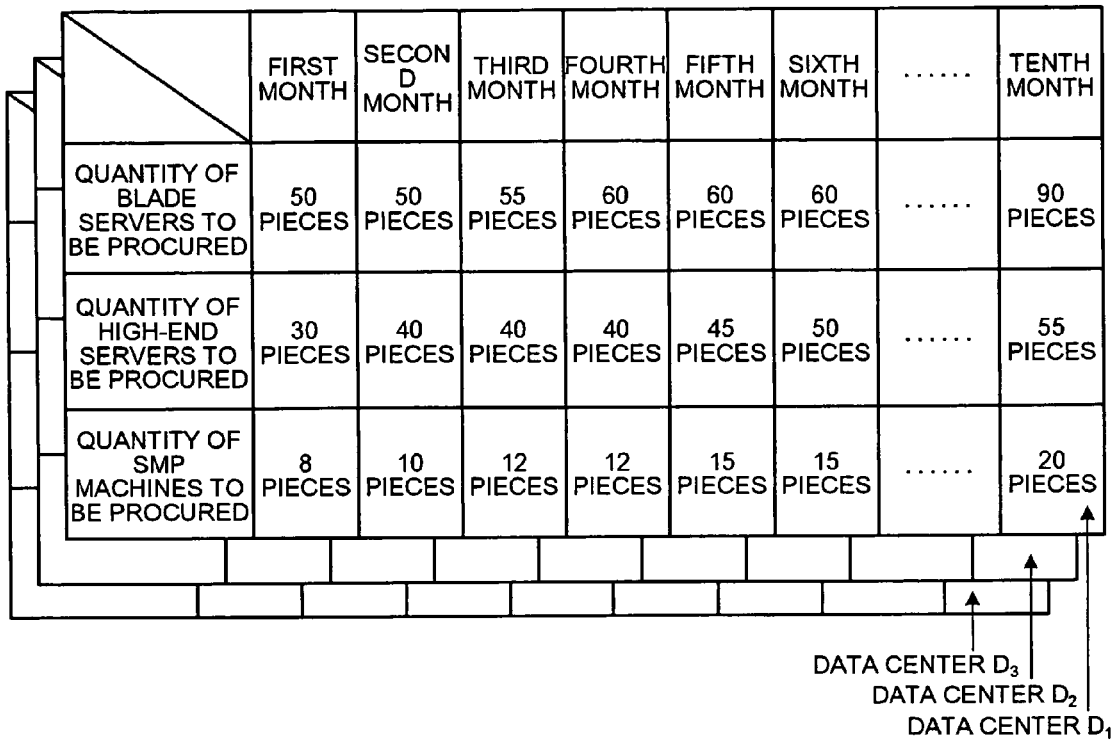
FIG. 7 is a schematic for illustrating an equipment procurement plan.

FIG. 7 is a schematic for illustrating an equipment procurement plan. By obtaining the equipment procurement plan shown in FIG. 7, the operator of the distributed IDC system 101 can obtain the optimized estimate of the necessary equipment amount, the timing of the equipment addition, and the equipment amount to be added of the data center $D_i$ for one year in the future, and can refer to the estimate for the equipment investment plan. The output data shown in FIG. 7 represent the equipment procurement plan of each data center $D_i$ in the future.

The following Equations 1 to 5 are calculation equations that express the relation between the optimization problem, and the compatibility and the equipment procurement costs in the data center $D_i$.

$$F_{sat}[ssid] = \frac{\sum_{mt}(R_{mt}^{ssid} \times Compat[Tc_{ssid}, ly_{ssid}, mt])}{L_{ssid} \times K[Tc_{ssid}, ly_{ssid}]} \quad (1)$$

$$F_{sat} = \sum_{ssid} F_{sat}[ssid] \quad (2)$$

$$F_{cost} = \sum_{mt}\left(price_{mt} \times \sum_{ssid} R_{mt}^{ssid}\right) \quad (3)$$

$$L[stid, D_i] = \sum_{ssid \in (stid, Di)} L_{ssid} \quad (4)$$

$$L_{ssid} = Dist[stid, ly_{ssid}] \times L[stid, D_i] \quad (5)$$

The following Equations 6 to 9 are calculation equations relating to the load distribution optimization among the data centers $D_i$.

$$F_{BL} = \quad (6)$$
$$\sigma\left(\sum_{ssid \in g(D1)} F_{sat}[ssid], \sum_{ssid \in g(D2)} F_{sat}[ssid], \ldots, \sum_{ssid \in g(Dn)} F_{sat}[ssid]\right)$$

-continued $$F_{Loc} = \quad (7)$$
$$\sum_{stid}\left[\sum_{i}^{n}(W[stid, D_i] \times L[stid, D_i])/L[stid, t] \times \max_{i}^{n} W[stid, D_i]\right]$$

$$L[stid, t] = \sum_{i}^{n} L[stid, D_i] \quad (8)$$

Definitions of expressions in the above Equations 1 to 8 will be listed in Table 1 below.

TABLE 1

| Expression | Definition |
|---|---|
| $F_{sat}[ssid]$ | The resources demand satisfying rate of the service section $SS_{ssid}$ |
| $R_{mt}^{ssid}$ | The resources allocated amount of the computer hardware $M_imt$ allocated to the service section $SS_{ssid}$ |
| $L_{ssid}$ | The load amount (the number of transactions per second) of the service section $SS_{ssid}$ |
| $K[Tc_{ssid}, ly_{ssid}]$ | The number of resource points necessary for processing one transaction per second of a task of the layer ly of the service class Tc (weight of a task) |
| $Compat[Tc_{ssid}, ly_{ssid}, mt]$ | The compatibility between the type of task and computer hardware $M_imt$ of a task of which the service class is Tc and the layer is ly |
| $Tc_{ssid}$ | The service class that the service section $SS_{ssid}$ belongs |
| $ly_{ssid}$ | The layer that the service section $SS_{ssid}$ belongs |
| $F_{sat}$ | The first objective function (resources demand satisfying rate) |
| $price_{mt}$ | The purchase unit price of one piece of computer hardware $M_imt$ |
| $L[stid, D_i]$ | The distributed amount of the demand amount $L[stid]$ to the data center $D_i$ |
| $F_{cost}$ | The second objective function |
| $g(stid, D_i)$ | The set of service sections belonging to the service tree $ST_{stid}$ in the data center $D_i$ |
| $D_i$ | The data center with an identification number i |
| $F_{BL}$ | The third objective function (the load uniformity) |
| $g(D_i)$ | The set of all the service sections $SS_{ssid}$ in the data center $D_i$ |
| $F_{LDC}$ | The fourth objective function (distribution appropriateness) |
| $Dist[stid, ly_{ssid}]$ | The inter-layer load distribution ratio of the layer ly of the service tree $ST_{stid}$ |
| $L[stid]$ | The demand amount (the number of transactions per second) of the service tree $ST_{stid}$ |
| $W[stid, D_i]$ | The weighting coefficient indicating the relative appropriateness of the distribution of the demand amount of the service tree $ST_{ssid}$ to the data centers $D_i$ |

An example of the formulation of the quantitative definition of the compatibility in the above Equation 1 is expressed in Equation 9 below.

$$Compat[Tc, ly, \text{Blade}] = \frac{Tp(Tc, ly, Hz, \text{Blade})}{\max\{Tp(Tc, ly, Hz, mt)\}} \quad (9)$$

In the above Equation 9, Tp (Tc, ly, Hz, Blade) is the throughput obtained when the layer ly of the service class Tc is executed by a blade server of the same CPU clock frequency (Hz).

Tp (Tc, ly, Hz, mt (mt=Blade, Hsvr, SMP) is the throughput obtained when the layer ly of the service class Tc is executed by the computer hardware $M_i$mt of the same CPU clock frequency (Hz).

The determining variable $R_{mt}^{ssid}$ is a variable that relates to all the service trees $ST_{stid}$, L[stid, $D_i$] for the data centers Di, and all the service sections $SS_{ssid}$, and the type mt of computer hardware.

The above first objective function corresponds to the above Equation 2. The second objective function corresponds to the above Equation 3. The third objective function corresponds to the above Equation 6. The fourth objective function corresponds to the above Equation 7.

Compat[$Tc_{ssid}$, $ly_{ssid}$, mt] represents the compatibility between the type of task determined by a combination of a service class Tc and a layer ly, and the type mt of computer hardware and, therefore, is obtained using an equation expressed in Equation 9 by bench marking executed prior to the optimization process of the resource plan.

K[$Tc_{ssid}$, $ly_{ssid}$] represents so-called "the weight of a task" (necessary computing resources amount to process one user request per one second) for the type of task determined by a combination of a service class Tc and a layer ly, and this is also obtained by bench marking executed prior to the optimization process of the resource plan.

Equation 2 that corresponds to the first objective function is obtained by calculating $F_{sat}$[ssid] of Equation 1 respectively for all the service sections $SS_{ssid}$ and totaling the obtained $F_{sat}$[ssid] for all the service sections $SS_{ssid}$. $F_{sat}$[ssid] indicates how sufficient computing resources are allocated to the demand of the computing resources that corresponds to the load amount arrived at the service sections $SS_{ssid}$.

The denominator on the right-hand side of Equation 1 is the product of the number of user requests per second $L_{ssid}$ arrived at the service section $SS_{ssid}$ and K[$Tc_{ssid}$, $ly_{ssid}$] that represents "weight of a task".

The numerator on the right-hand side in Equation 1 is obtained by weighting the computing resources allocated amount (=determining variable $R_{mt}^{ssid}$) allocated to the service section $SS_{ssid}$ using the compatibility between the type mt of computer hardware and the type $Tc_{ssid}$ of task, and totaling the obtained values for all types mt of computer hardware.

Equation 3 that corresponds to the second objective function is obtained by weighting the computing resources allocated amount (=determining variable $R_{mt}^{ssid}$) for all computer hardware $M_i$mt in the data center $D_i$, using the purchase unit price of the computer hardware $M_i$mt corresponding to the type mt of computer hardware of each piece of computer hardware, and totaling the obtained values, and indicates the necessary costs to purchase all equipment of the entire data center $D_i$.

Equation 6 that corresponds to the third objective function is a function that indicates how uniform the satisfying rate of the resource demand of each data center $D_i$ is among the data centers. In Equation 6, σ is a function that returns the standard deviation.

Equation 7 that corresponds to the fourth objective function is a function that indicates how much the distribution and the disposition of the service tree load amounts to data centers $D_i$ fit the demand of the customer that has consigned the operation of the network service. W[stid, $D_i$] on the right-hand side of Equation 7 indicates at what weight the customer that has consigned the operation of the service desires the load amount of the service tree $ST_{stid}$ to be operated in the data center $D_i$.

For example, the data centers $D_1$, $D_2$, $D_3$ exist as the data centers $D_i$ and, when a customer desires the service load to be mainly processed in the data center $D_1$ and desires no heavy loads to be distributed to the data centers $D_2$ and $D_3$, settings are made, for example, as below.

W[stid,$D_1$]=9

W[stid,$D_2$]=1

W[stid,$D_3$]=1

The value in Equation 7 is set to take a larger value as the load distribution between the data centers $D_1$, $D_2$ of the load amount of the service tree $ST_{stid}$ becomes closer to the desired distribution of the customer.

In the optimization problems shown in Equations 1 to 9 described above, by considering both Equations 2 and 3 to be objective functions and optimizing these equations simultaneously, creation of a resource plan is enabled, that minimizes the equipment procurement costs of all the computer hardware of the data center $D_i$ without lowering the total throughput of the data center $D_i$ as much as possible.

By optimizing simultaneously the objective functions of both Equations 6 and 7, creation of a resource plan is enabled, that fits the load distribution of each service tree $ST_{stid}$ among the data centers to the desire of the customer as closely as possible while facilitating uniform load weights among the data centers.

The solutions of the optimization problems shown in Equations 1 to 9 are obtained for each time slot and, when the optimal values for the determining variable $R_{mt}^{ssid}$ and the load amount of the service section $SS_{stid}$ (the number of user requests per second). $L_{ssid}$ are obtained, the ratio for distributing the load amount $L_{ssid}$ of the service section $SS_{ssid}$ to the hardware $M_i$mt group of each type mt of computer hardware (inter-computer-hardware-type mt load distribution ratio DR) is obtained.

That is, the value of each determining variable $R_{mt}^{ssid}$ having the same service section $SS_{ssid}$ is weighted by the compatibility between the type mt of computer hardware and a task determined by the service section $SS_{ssid}$, the obtained values are totaled for all types mt of computer hardware, and percentage of the product of the value of each determining variable $R_{mt}^{ssid}$ accounting for in the totaled value and the corresponding compatibility is obtained.

Equation 10 below is a calculation equation of the inter-computer-hardware-type mt load distribution ratio DR defined for a blade server. In Equation 10 below, the ratio for distributing the load amount $L_{ssid}$ for the service section $SS_{ssid}$ to each of the types mt of computer hardware of the blade server, the high-end server, and the SMP machine that are allocated to the service section $SS_{ssid}$ as the computing resources is defined.

$$DR = \frac{R_{Blade}^{ssid} \times Compat[Tc_{ssid}, ly_{ssid}, \text{Blade}]}{\sum (R_{mt}^{ssid} \times Compat[Tc_{ssid}, ly_{ssid}, mt])} \quad (10)$$

The optimization problem defined by Equations 1 to 8 described above is a multi-purpose optimization problem. In Equation 2, both the numerator and the denominator include a determining variable. The third objective function corresponding to Equation 6 includes a function for calculating the standard deviation σ. Equations 2 and 6 are non-linear objective functions.

Therefore, the optimization problem defined by Equations 1 to 8 is a multi-purpose non-linear optimization problem and the aspiration level method can be applied as a method for obtaining the optimal solution of such an optimization problem.

The basic idea of obtaining the optimal solution using the aspiration level method will be described. In a multi-purpose optimization problem, trade-off relations generally exist among different objective functions. Therefore, in a solution space (Each of all determining variables acts as a coordinate axis and each combination of specific values that all the determining variables may take respectively indicates a point in the space), a partial space referred to as "Pareto solution set" and, in a Pareto solution space, the values of all the objective functions can not be improved simultaneously by moving from any point to any point in the space.

A multi-dimensional space S is constructed using the value of each multi-purpose function constituting the multi-purpose optimization problem as coordinate axes. A projection of a Pareto solution space to a multi-dimensional space S is created by applying the values of determining variables that represent all points belonging to a Pareto solution set in the solution space, to the objective functions. This projection constitutes a curved surface in the multi-dimensional space S. This curved surface is defined as a Pareto curved surface in the multi-dimensional space S.

Figure 8:
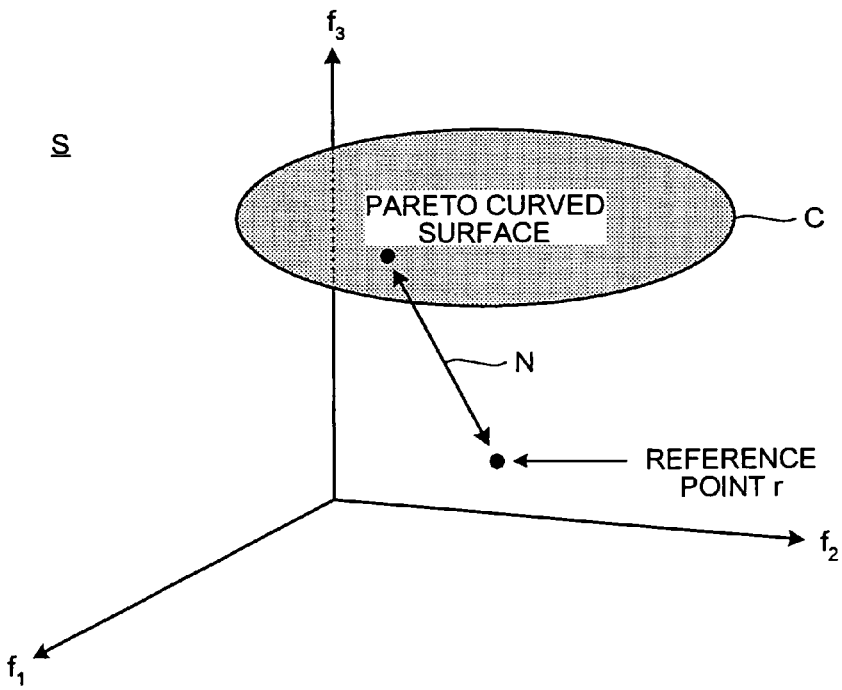
FIG. 8 is a schematic for illustrating a multi-dimensional space and a Pareto curved surface.

Examples of the multi-dimensional space S and a Pareto curved surface will be shown. FIG. 8 is a schematic for illustrating the multi-dimensional space S and a Pareto curved surface C. In FIG. 8, the optimal solution is obtained using three objective functions f1 to f3. Obtaining the optimal solution by the aspiration level method starts with setting a point referred to as "reference point".

A reference point r is one specific point in the multi-dimensional space S and is a point with coordinate values thereof that are the values of the aspiration levels of the objective functions $f_1$ to $f_3$ corresponding to the coordinate axes. The coordinate values of the reference point r will be shown in Equation 11 below.

$$\bar{r} = [\bar{r}_1, \bar{r}_2, \bar{r}_3]^T \quad (11)$$

where $\bar{r}_i$ is an aspiration level of $\bar{r}$

The aspiration levels of the objective functions $f_1$ to $f_3$ are the target values that are desired to be cleared by the objective functions $f_1$ to $f_3$ (when the functions $f_1$ to $f_3$ are objective functions for minimization, the values are values that an operator of a data center desires the values of the objective functions $f_1$ to $f_3$ to be equal or less than these values as a result of the optimization).

For example, for the second objective function described above, when an operator of a data center desires the procurement costs of the necessary equipment amount for the entire data center to be equal or less than ten million Japanese yen and executes optimization aiming at that price, the aspiration level of the second objective function is ten million Japanese yen. By obtaining the aspiration levels for all the objective functions $f_1$ to $f_3$, the coordinate of the reference point r in the multi-dimensional space S is determined.

A function is configured, that expresses a norm N of a vector from the reference point r to an arbitrary point in the Pareto curved surface, an optimization problem is constructed, that has this function as the only one objective function thereof, that is, a "norm minimization problem", and this norm minimization problem is solved. Thus, the optimal solution obtained is a temporary solution for the multi-purpose optimization problem. Whether or not the aspiration levels are cleared is checked by applying values of the determining variables based on this temporary solution to each of the objective functions $f_1$ to $f_3$.

In this case, when the aspiration levels of some of the objective functions are satisfied and the aspiration levels of other objective functions are not satisfied, the reference point r is moved by setting the aspiration levels of those objective functions to be more loose (that is, the aspiration levels are taken to be larger when the functions are objective functions for minimization), etc.

Figure 9:
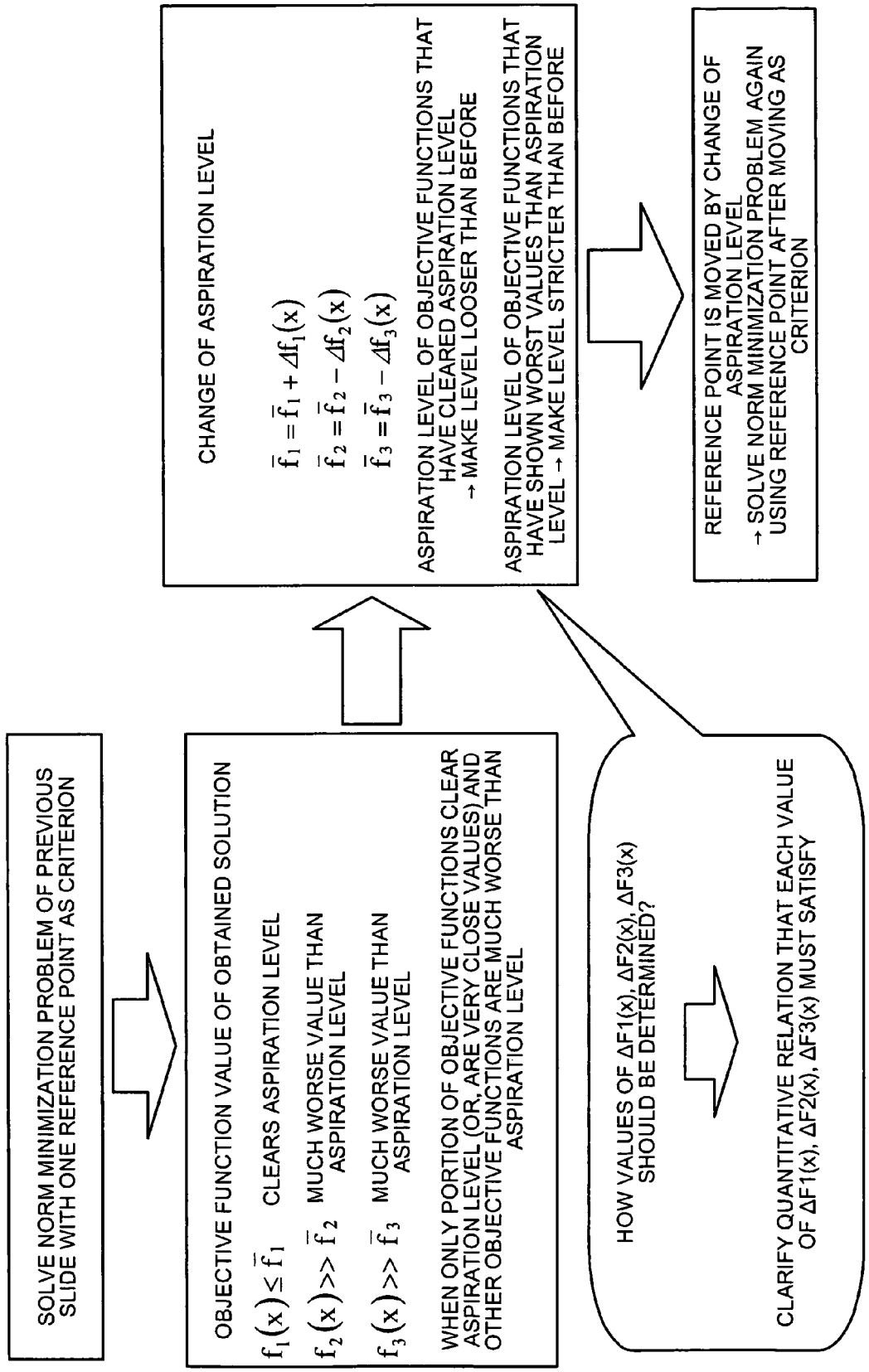
FIG. 9 is a schematic for illustrating a procedure of obtaining a temporary solution that satisfies an aspiration level of an objective function.

After moving the reference point r, another temporary solution is obtained by solving further a norm minimization problem using the reference point r after being moved as the reference. This procedure is repeated until a temporary solution that satisfies the aspiration levels of all the objective functions $f_1$ to $f_3$ can be obtained. FIG. 9 is a schematic for illustrating a procedure of obtaining a temporary solution that satisfies the aspiration levels of the objective functions $f_1$ to $f_3$ described above.

FIG. 10 is a flowchart of the multi-purpose optimization by the aspiration level method. In FIG. 10, a multi-purpose optimization problem P is formulated (step S1001). A norm minimization problem P' is formulated (step S1002). Thus, the multi-purpose optimization problem P is converted into scalar.

As shown in FIG. 8, the reference point r is set (step S1003). The optimal solution for the norm minimization problem P' is obtained (step S1004). Whether or not this optimal solution satisfies the specified conditions is determined (step S1005). When the optimal solution does not satisfy (step S1005: "NO"), the aspiration levels of the objective functions other than the objective functions to be improved are alleviated (step S1006).

An adjustment among the aspiration levels by a trade-off analysis is executed (step S1007) and the reference point r is moved (step S1008). The procedure is returned to step S1004. On the other hand, in step S1005, when the optimal solution of the norm minimization problem P' satisfies the specified conditions (step S1005: "YES"), the optimal solution is outputted (step S1009).

FIG. 11 is a schematic for illustrating formulation of the multi-purpose optimization problem P shown at step S1001 of FIG. 10. In FIG. 11, a bold "x" is a vector having elements that are all the determining variables of the multi-purpose optimization problem and represents a vector in the solution space. Bold letters, "f(x)" is a vector of an objective function having elements that are objective functions and receives a vector x as an input. Bold letters, "g(x)" is a vector having elements that are the right-hand sides of constraint equations (an un-equality with the left-hand side that is an equation including the vector x as a parameter and the right-hand side that becomes zero) of the multi-purpose optimization problem.

FIG. 12 is a schematic for illustrating formulation of the norm minimization problem P' shown at step S1002 of FIG. 10. FIG. 12 also shows the overview of the multi-purpose optimization by the aspiration level method.

FIG. 13 is a schematic of the resource plan creating apparatus 100. As shown in FIG. 13, the resource plan creating apparatus 100 includes a CPU 1301, a read-only memory (ROM) 1302, a random-access memory (RAM) 1303, a hard disk drive (HDD) 1304, a hard disk (HD) 1305, a flexible disk drive (FDD) 1306, a flexible disk (FD) 1307 as an example of a detachable recording medium, a display 1308, an interface (I/F) 1309, a keyboard 1310, a mouse 1311, a scanner 1312, and a printer 1313. Each component is connected by a bus 1300 with each other.

The CPU 1301 administers the control of the entire resource plan creating apparatus 100. The ROM 1302 stores programs such as a boot program, etc. The RAM 1303 is used by the CPU 1301 as a work area. The HDD 1304 controls reading/writing of data from/to the HD 1305 according to the control of the CPU 1301. The HD 1305 stores data written according to the control of the HDD 1304.

The FDD 1306 controls reading/writing of data from/to the FD 1307 according to the control of the CPU 1301. The FD 1307 stores the data written by the control of the FDD 1306, causes the resource plan creating apparatus 100 to read the data stored in the FD 1307, etc.

As a detachable recording medium, in addition to the FD 1307, a compact-disc read-only memory (CD-ROM), a compact-disc recordable (CD-R), a compact-disc rewritable (CD-RW), a magneto optical (MO) disk, a digital versatile disk (DVD), and a memory card may be used. In addition to a cursor, and icons or tool boxes, the display 1308 displays data such as texts, images, functional information, etc. This display 1308 may employ, for example, a cathode ray tube (CRT), a thin film transistor (TFT) liquid crystal display (LCD), a plasma display, etc.

The I/F 1309 is connected with the network 110 such as the Internet through a communication line and is connected with other apparatuses through this network 110. The I/F 1309 administers an internal interface with the network 110 and controls input/output of data from external apparatuses. For example, a modem, a local area network (LAN), etc., may be employed as the I/F 1309.

The keyboard 1310 includes keys for inputting letters, digits, various instructions, etc., and executes input of data. The keyboard 1310 may be a touch-panel-type input pad or ten-keys, etc. The mouse 1311 executes shift of the cursor, selection of a region, or shift and size change of windows. The mouse 1311 may be a track ball or a joy stick that similarly includes the function as a pointing device.

The scanner 1312 optically reads images and captures image data into the resource plan creating apparatus 100. The scanner 1312 may have an optical character reader (OCR) function. The printer 1313 prints image data and text data. For example, a laser printer or an ink jet printer may be employed as the printer 1313.

Figure 14:
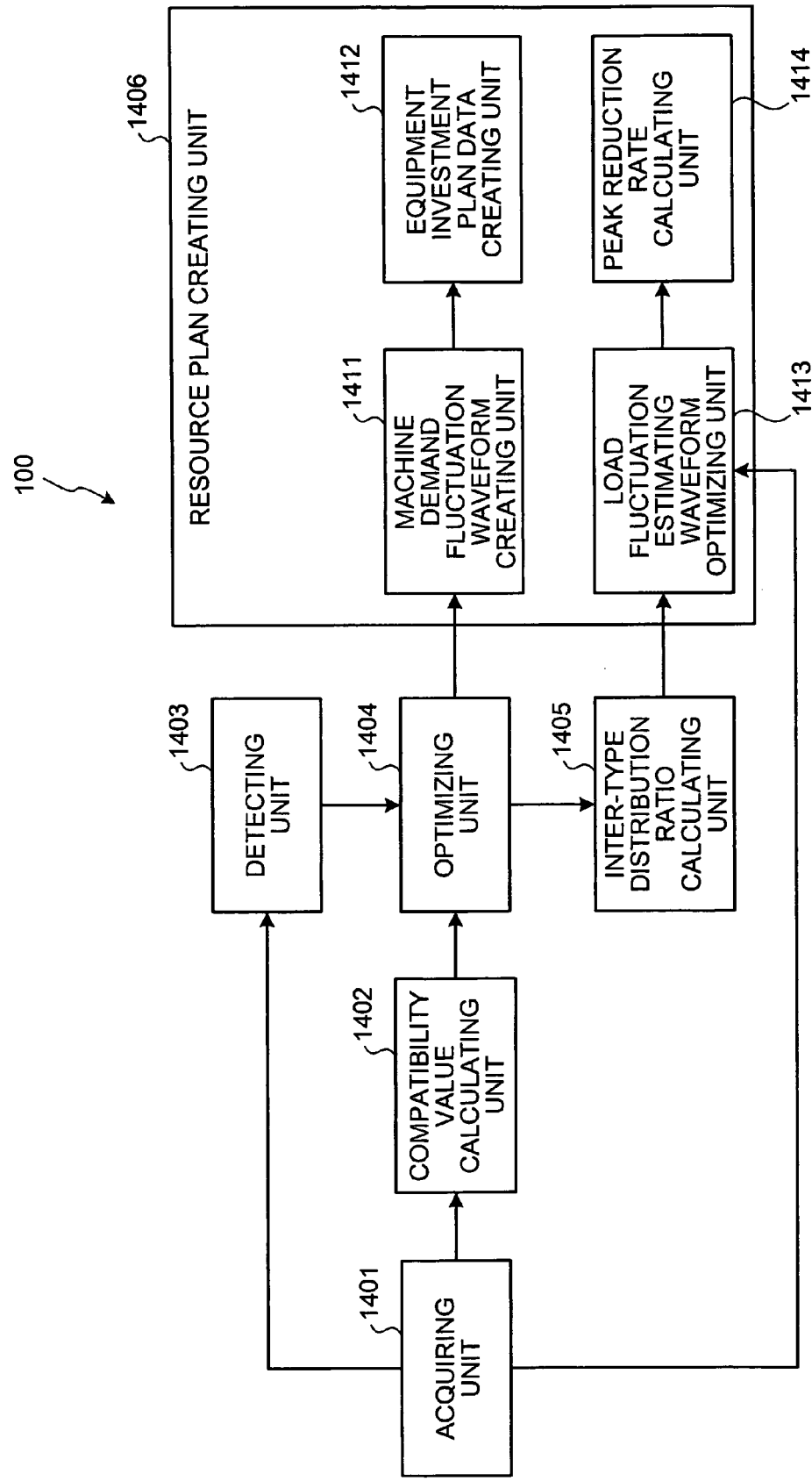
FIG. 14 is a block diagram of the resource plan creating apparatus.

FIG. 14 is a block diagram of the resource plan creating apparatus 100. The resource plan creating apparatus 100 is constituted of an acquiring unit 1401, a compatibility value calculating unit 1402, a detecting unit 1403, an optimizing unit 1404, an inter-type distribution ratio calculating unit 1405, and a resource plan creating unit 1406.

The acquiring unit 1401 acquires various types of information. For example, the acquiring unit 1401 receives inputs of estimation waveform of load fluctuation of service trees relating to the network services A to C as shown in FIG. 1; and acquires process performance values obtained when specific tasks selected from a plurality of types of tasks relating to a network service operated by the distributed IDC system 101 constituted of the plurality of data centers $D_1$ to $D_n$, is executed respectively by a plurality of types of computer hardware $M_i$mt in the data centers $D_i$.

A specific task is an arbitrary task in a plurality of types of tasks. For example, assuming two types of tasks and three types of computer hardware $M_i$mt, six types of processing performance values can be obtained.

For example, when n=3 and web services are operated by the distributed IDC system 101 constituted of the data centers $D_1$ to $D_3$, the throughputs obtained when a plurality of types of tasks (web server tasks, AP server tasks, and DB tasks) are executed respectively by a plurality of types of computer hardware $M_i$mt (a blade server, a high-end server, and an SMP machine) in each data center $D_i$ is acquired as processing performance values.

More specifically, taking the case where the data center $D_i$ executes a DB task as an example, as shown in FIG. 2A, an achieved throughput obtained when the DB task is executed on the blade server (corresponding to Tp (Tc, ly, Hz, Blade) of the above Equation 9), an achieved throughput obtained when the DB task is executed on the high-end server (corresponding to Tp (Tc, ly, Hz, mt(=high-end)) of the above Equation 9), and an achieved throughput obtained when the DB task is executed on the SMP machine (corresponding to Tp (Tc, ly, Hz, mt(=SMP)) of the above Equation 9) are acquired.

Based on the processing performance values acquired by the acquiring unit 1401, the compatibility value calculating unit 1402 calculates the compatibility value between a specific task and a specific computer hardware $M_i$mt that has been selected from a plurality of types of computer hardware $M_i$mt, where the specific computer hardware $M_i$mt is arbitrary computer hardware $M_i$mt in the plurality of types of computer hardware $M_i$mt.

More specifically, for example, the value obtained by using the processing performance value of the highest value in the processing performance values obtained respectively when the specific task is executed respectively on the plurality of types of computer hardware $M_i$mt as the denominator, and the processing performance value obtained when the specific task is executed on the specific computer hardware $M_i$mt as the numerator is calculated as the compatibility value.

More specifically, for example, when the data center $D_i$ executes the DB task, by substituting the achieved throughputs Tp (Tc, ly, Hz, Blade), Tp (Tc, ly, Hz, mt (=high-end)), and Tp (Tc, ly, Hz, mt(=SMP)) in the above Equation 9, the compatibility value Compat[Tc, ly, Blade] between the DB task and the blade server in the data center $D_i$ is calculated.

The detecting unit 1403 detects peak values for each time slot of the estimation waveform of load fluctuation of a service tree relating to each network service, that has been acquired by the acquiring unit 1401, as a load amounts L[stid, t] of the service tree $ST_{stid}$.

The optimizing unit 1404 obtains the optimal values of an allocated amount $M_{mt}^{ssid}$ and a load distributed amount L[stid, $D_i$] to the data center $D_i$ by solving the optimization problem using Equations 1 to 9 described above that include the compatibility value.

More specifically, for example, the optimal values of an allocated amount $M_{mt}^{ssid}$ and a load distributed amount L[stid, $D_i$] to the data center $D_i$ are obtained such that the satisfying rate $F_{sat}$ of the resources demand amount of the first objective function expressed in the above Equation 2 is maximized. By optimizing this first objective function, the resource plan can be optimized such that the throughput of the data center Di is maximized.

The optimizing unit 1404 optimizes the second objective function shown in the above Equation 3 such that the equipment procurement costs $F_{cost}$ is minimized. By facilitating the optimization of this second objective function, the equipment procurement costs in the data center $D_i$ can be minimized as much as possible. By executing the maximization of the first objective function and the minimization of the second objective function, optimization of the resource plan is enabled, that minimizes as much as possible the equipment procurement costs in the data center $D_i$ while the total throughput in the data center $D_i$ is simultaneously minimized as much possible.

The optimizing unit 1404 may optimize the third objective function shown in the above Equation 6 simultaneously with the first objective function and the second objective function such that the load uniformity $F_{BL}$ (standard deviation) of the third objective function is minimized. By executing the minimization of the third objective function simultaneously with the first objective function and the second objective function, the maximization of the peak reduction rate in the data center $D_i$ can be facilitated. Thus, the proportion of the load amounts of the data center $D_i$ can be always uniformed among the data centers $D_i$.

The optimization unit 1404 may optimize the fourth objective function shown in the above Equation 7 simultaneously with the first objective function and the second objective function (or the first objective function to the third objective function) such that the distribution appropriateness $F_{LOC}$ of the fourth objective function is maximized. By executing the maximization of the fourth objective function simultaneously with the first objective function and the second objective function (or the first objective function to the third objective function), the distribution of the load that fits the desire of the customer can be realized.

As described above, the optimization process by the optimizing unit 1404 may be realized using the aspiration level method shown in FIGS. 8 to 12. Otherwise, the optimization may be executed based on Pareto theory. The optimization of the estimation waveform of load fluctuation of each service tree is completed by the optimizing unit 1404 as shown in FIG. 22.

Using the optimal solution obtained from the optimization by the optimizing unit 1404, the inter-type load distribution ratio calculating unit 1405 calculates the inter-type load distribution ratio DR between a specific computer hardware $M_i$mt and another piece of computer hardware $M_i$mt of a different type from that of the specific computer hardware $M_i$mt. More specifically, for example, the inter-type load distribution ratio DR is calculated using the above Equation 10.

Using the compatibility value calculated by the compatibility value calculating unit 1402, the resource plan creating unit 1406 creates a resource plan of the distributed IDC system 101. More specifically, the resource plan creating unit 1406 includes a machine demand fluctuation waveform creating unit 1411, an equipment investment plan data creating unit 1412, an estimation waveform optimizing unit 1413, and a peak reduction rate calculating unit 1414. The output results from these units constitute the resource plan.

The machine demand fluctuation waveform creating unit 1411 creates a machine demand fluctuation waveform representing the variation over time of the necessary amount of the equipment procurement for each type mt of computer hardware. More specifically, as shown in FIG. 5, the necessary amount of the equipment procurement for each type of computer hardware mt and for each data center $D_i$ in a time slot by totaling the computing resources allocated amount (the optimal amount of the determining variable $R_{mt}^{ssid}$) across the data centers $D_i$ for each type mt of computer hardware.

For all the time slots, by obtaining the necessary amount of the equipment procurement for each type mt of computer hardware and lining up the obtained necessary amounts in order of the time of the time slots in the time sequence, the machine demand fluctuation waveform of the data center $D_i$ can be created. For example, the waveform depicted by a zigzag line shown in FIG. 3A is the machine demand fluctuation waveform of the data center $D_i$.

The equipment investment plan data creating unit 1412 creates equipment investment plan data Based on the machine demand fluctuation waveform. More specifically, as shown in FIG. 3A, peak values are detected one by one from the equipment procurement section S1. For example, the peak value P1 is detected in the equipment procurement section S1. In the equipment procurement section S2 and those thereafter, only the peaks larger than those in the equipment procurement sections to the one immediately before the current section are detected.

For example, as shown in FIG. 3A, in the equipment procurement section S2, no peak value is present that exceeds the peak value P1 in the equipment procurement section S1 while, in the equipment procurement section S3, the peak value P2 (>P1) is detected. Therefore, as shown in FIG. 3B, the border between the equipment procurement section S3 for which the peak value P2 has been detected and the equipment procurement section S2 immediately before the section S3 is the equipment addition timing at which the equipment procurement costs for a first equipment addition is born.

Corresponding to the detected peak values P1, P2, ..., the equipment investment plan data creating unit 1412 calculates the equipment procurement amount to be paid shown in FIG. 3B and the quantity of each computer hardware $M_i$mt to be procured shown in FIG. 7.

Based on the inter-type load distribution ratio DR, the estimation waveform optimizing unit 1413 distributes the load by distributing the load corresponding to each derivative services in the estimation waveform of load fluctuation that has been optimized by the optimizing unit 1404 as the estimation waveform of load fluctuation for each type mt of computer hardware.

Based on the estimation waveform of load fluctuation that has been optimized by the optimizing unit 1404, the peak reduction rate calculating unit 1414 calculates the peak reduction rate PRR for each data center $D_i$. More specifically, as shown in FIG. 22, the unit 1404 calculates the peak reduction rate PRR for each data center $D_i$ from the peak value of the estimation waveform of load fluctuation before being optimized and the peak value of the estimation waveform of load fluctuation after being optimized (see Equations 1 to 3).

The above-mentioned acquiring unit 1401, a compatibility value calculating unit 1402, a detecting unit 1403, an optimizing unit 1404, an inter-type distribution ratio calculating unit 1405, and a resource plan creating unit 1406 realize the functions thereof by, more specifically, executing by the CPU 1301 a program recorded in a recording medium such as, for example, an ROM 1302, an RAM 1303, an HD 1305, an FD 1307, etc., shown in FIG. 13.

Figure 15:
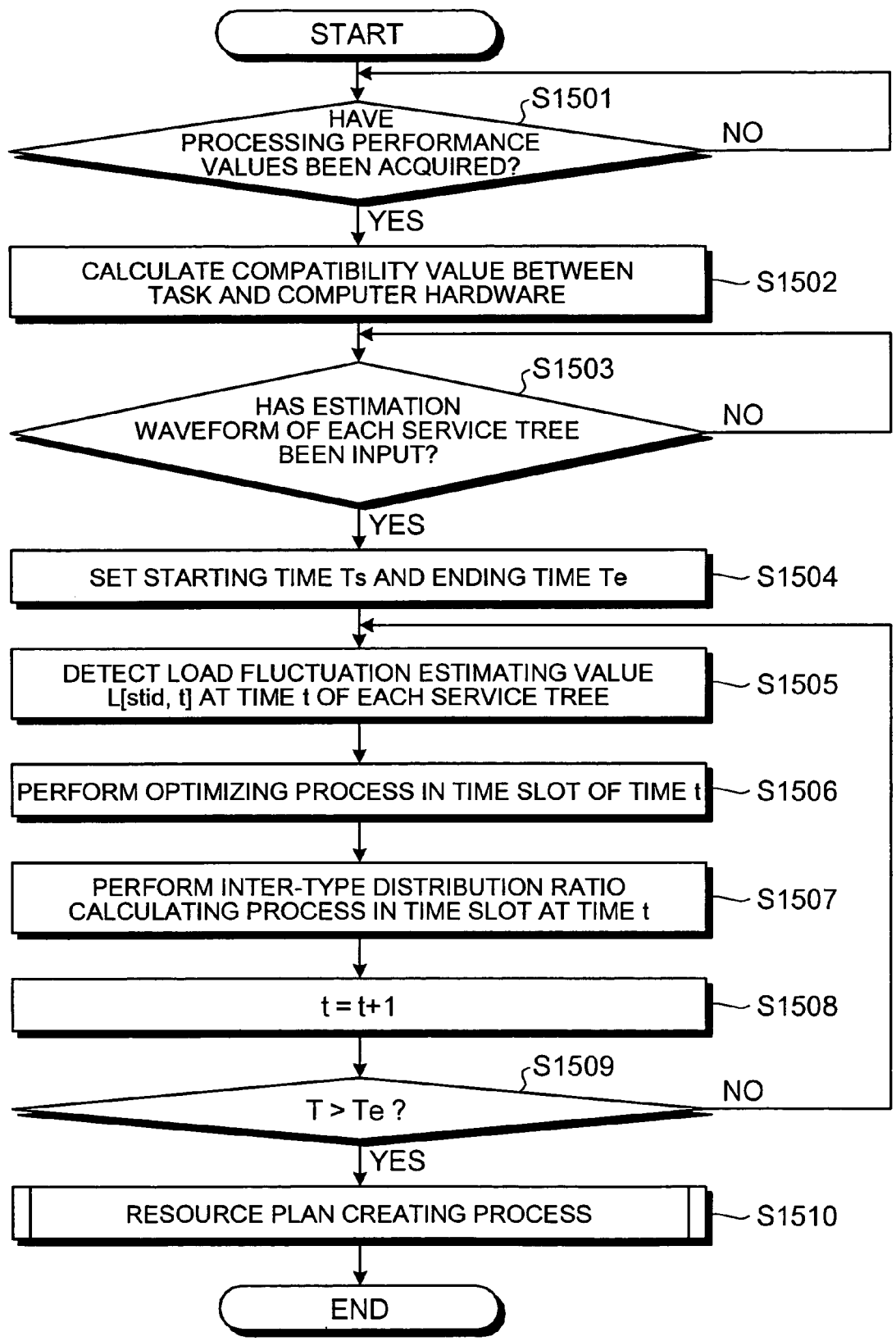
FIG. 15 is a flowchart of a resource plan creating process by the resource plan creating apparatus.

FIG. 15 is a flowchart of a resource plan creating process by the resource plan creating apparatus 100 according to the embodiment of the present invention. In FIG. 15, acquiring of the processing performance value by the acquiring unit 1401 is waited for (step S1501: "NO") and, when the processing performance value is acquired (step S1501: Yes), the compatibility value between a task and computer hardware $M_i$mt is calculated by the compatibility value calculating unit 1402 (step S1502).

Inputting of the estimation waveform of load fluctuation (see FIG. 22) of each service tree $ST_{stid}$ by the acquiring unit 1401 is waited for (step S1503: "NO") and, when the estimation waveform of load fluctuation is inputted (step S1503: Yes), a starting time Ts and a ending time Te are set (step S1504). The starting time Ts is set to, for example, "present"

and the ending time is set to, for example, "one year from now". Thus, a resource plan for coming one year can be created.

From the estimation waveform of load fluctuation of each service tree $ST_{stid}$, a estimation waveform of load fluctuation L[stid, t] at an arbitrary time t of each service tree $ST_{stid}$ is detected by the detecting unit 1403 (step S1505).

Using the compatibility value and the load fluctuation estimating value L[stid, t], an optimizing process in a time slot at the time t is executed by the optimizing unit 1404 (step 1506). That is, as described above, the optimal solution that minimizes or maximizes the first objective function to the fourth objective function is obtained.

An inter-type distribution ratio calculating process (see Equation 10) of different types of computer hardware $M_i$mt in the time slot at the time t is executed by the inter-type distribution ratio calculating unit 1405 (step S1507). Thus, the distribution ratio for each type of machine in each derivative service load in a time slot at the time t can be obtained.

The time slot is switched to the next time slot by incrementing the time t (step S1508) and whether or not the time t is larger than the ending time Te is determined (step S1509). When the time t is equal to or smaller than the ending time Te (step S1509: "NO"), the procedure is returned to step S1505 and steps S1505 to S1509 described above are executed.

On the other hand, when the time t is larger than the ending time Te (step S1509: Yes), a resource plan creating process is executed by the resource plan creating unit 1406 (step S1510). The series 6f processes end.

Figure 16:
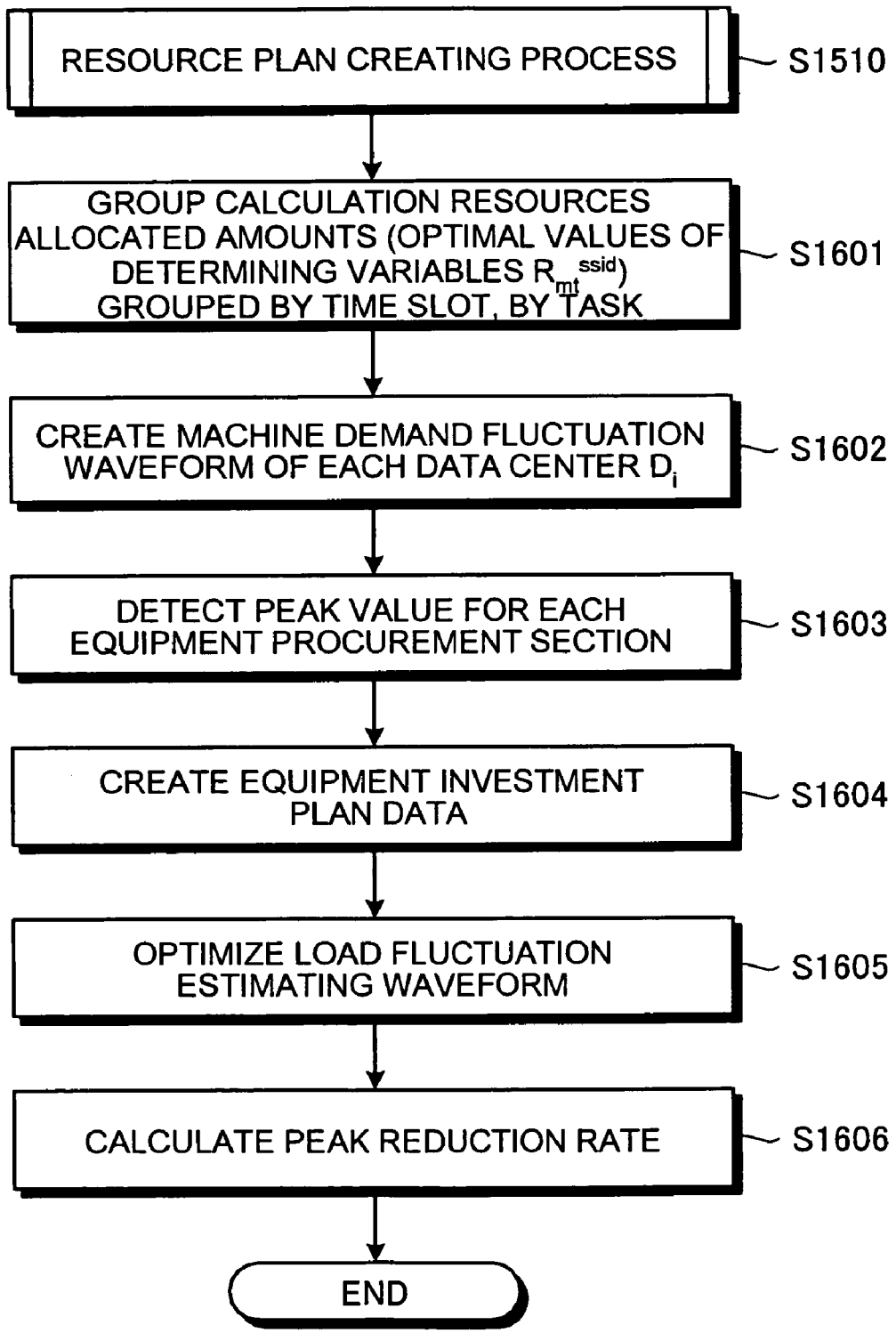
FIG. 16 is a flowchart of a detailed procedure of the resource plan creating process.

FIG. 16 is a flowchart of a detailed procedure of the resource plan creating process at step S1510.

In FIG. 16, as shown in FIG. 5, the computing resources allocated amounts (the optimal values of the determining variable $R_{mt}^{ssid}$) respectively for the time slots are grouped by task by the machine demand fluctuation waveform creating unit 1411 (step S1601). As shown in FIG. 3A, a machine demand fluctuation waveform of each data center $D_i$ is created (step S1602).

By the equipment investment plan data creating unit 1412, the peak value for each equipment procurement section is detected from the machine demand estimating waveform created at step S1601 (step S1603), and equipment investment plan data such as the equipment procurement amount to be paid and the equipment addition timing as shown in FIG. 3B and the equipment procurement plan showing the quantity of equipment to be procured for each equipment procurement section as shown in FIG. 7, etc., are created (step S1604).

The estimation waveform of load fluctuation (see FIG. 22) inputted at step S1503 is optimized by the estimation waveform optimizing unit 1413 using the inter-type distribution ratio DR (step S1605). The peak reduction rate is calculated from the fluctuation estimating waveform before and after the optimization by the peak reduction rate calculating unit 1414 (step S1606). Thus, the resource plan creating process ends.

Figure 17A:
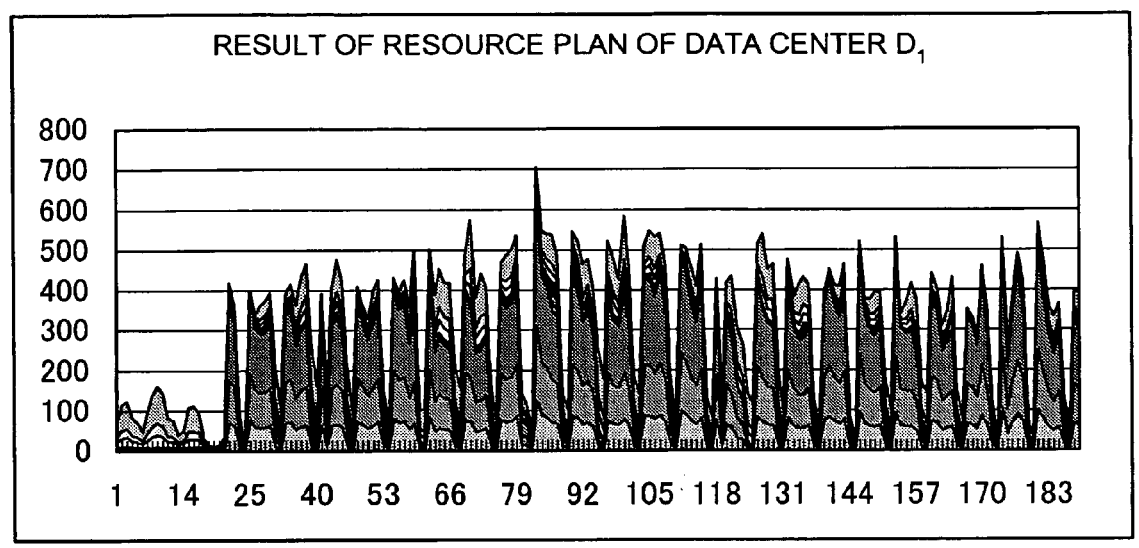
FIG. 17A is a graph of an estimation waveform of load fluctuation of a data center $D_1$ optimized by an estimation waveform optimizing unit.
Figure 17B:
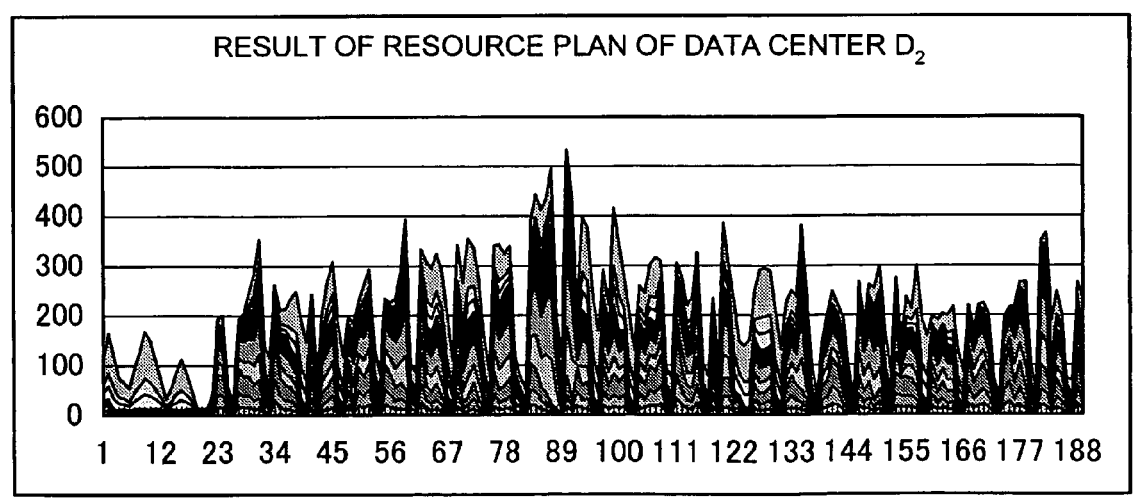
FIG. 17B is a graph of an estimation waveform of load fluctuation of a data center $D_2$ optimized by the estimation waveform optimizing unit.
Figure 17C:
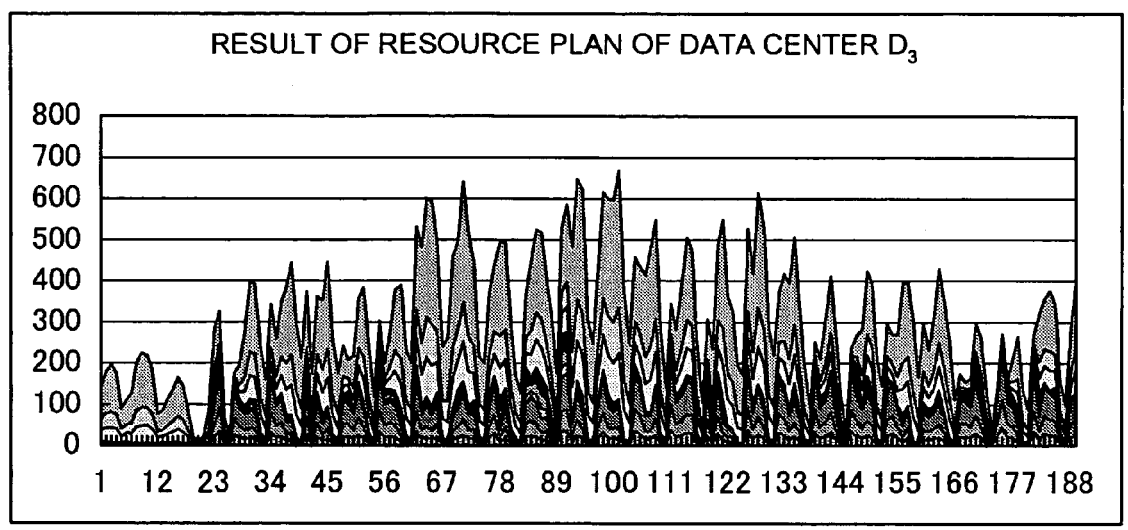
FIG. 17C is a graph of an estimation waveform of load fluctuation of a data center $D_3$ optimized by the estimation waveform optimizing unit.

An example of an output of the resource plan created by the resource plan creating apparatus 100 will be described. FIGS. 17A to 17C are graphs of estimation waveforms of load fluctuation s of data centers $D_1$ to $D_3$ optimized by the estimation waveform optimizing unit 1413. In each of FIGS. 17A to 17C, the horizontal axis represents the time set at step S1504 and the vertical axis represents the fluctuating load.

Figure 18A:
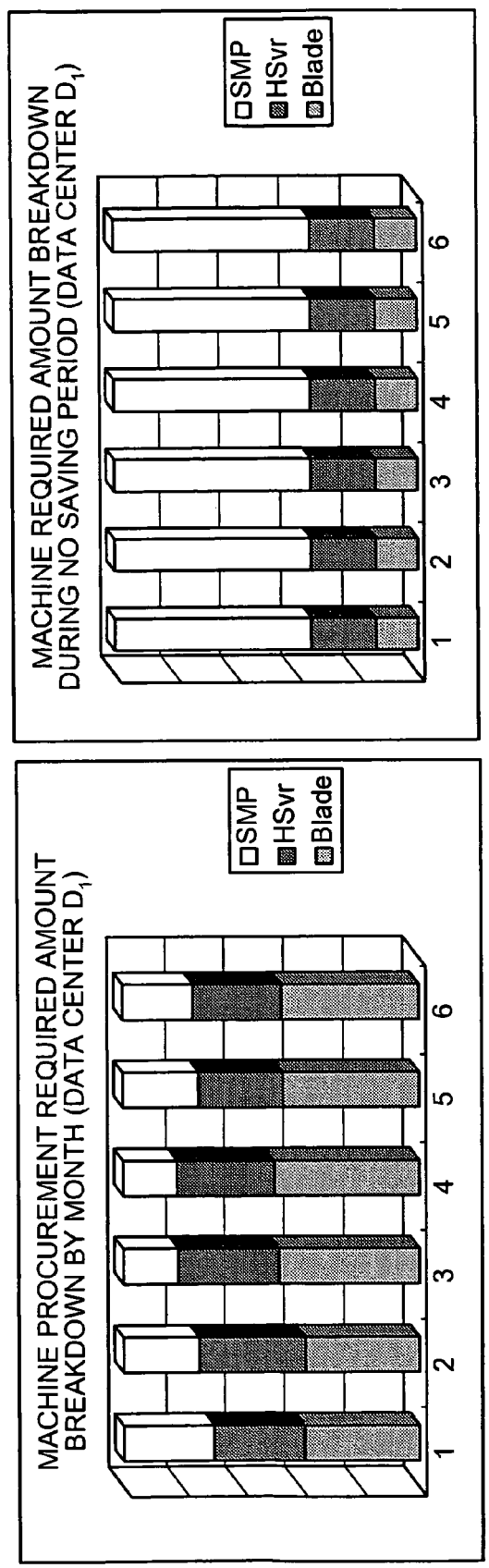
FIG. 18A is a bar chart of a breakdown ratio of an equipment procurement amount among different types of computer hardware in each equipment procurement section in the data center $D_1$.
Figure 18B:
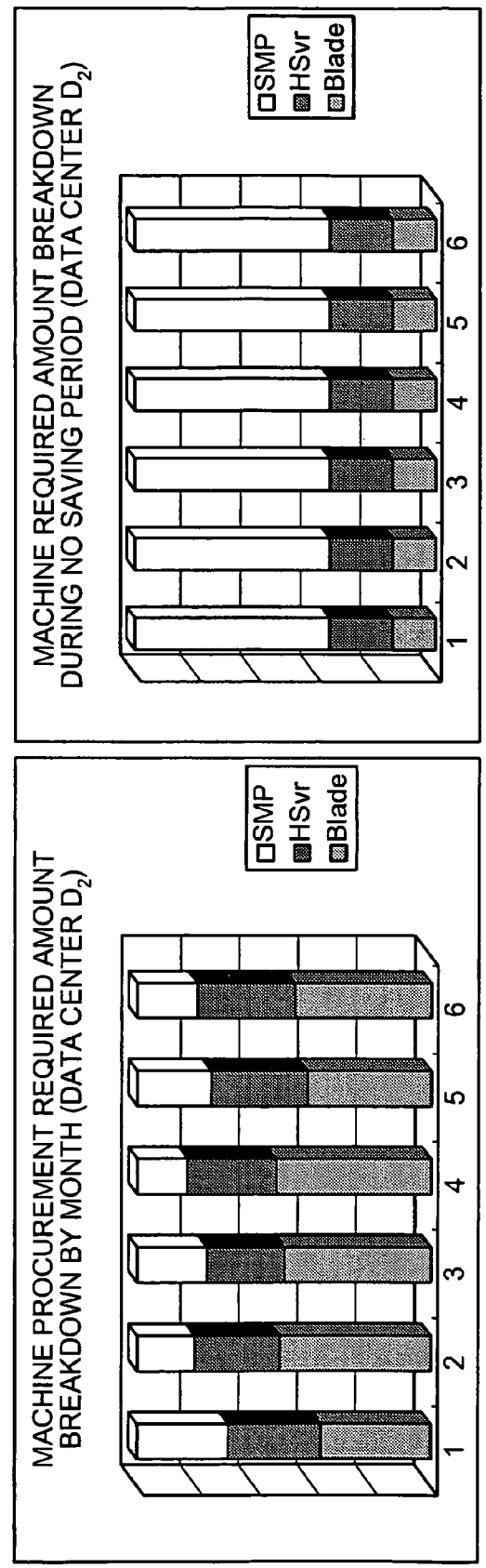
FIG. 18B is a bar chart of a breakdown ratio of an equipment procurement amount among different types of computer hardware in each equipment procurement section in the data center $D_2$.
Figure 18C:
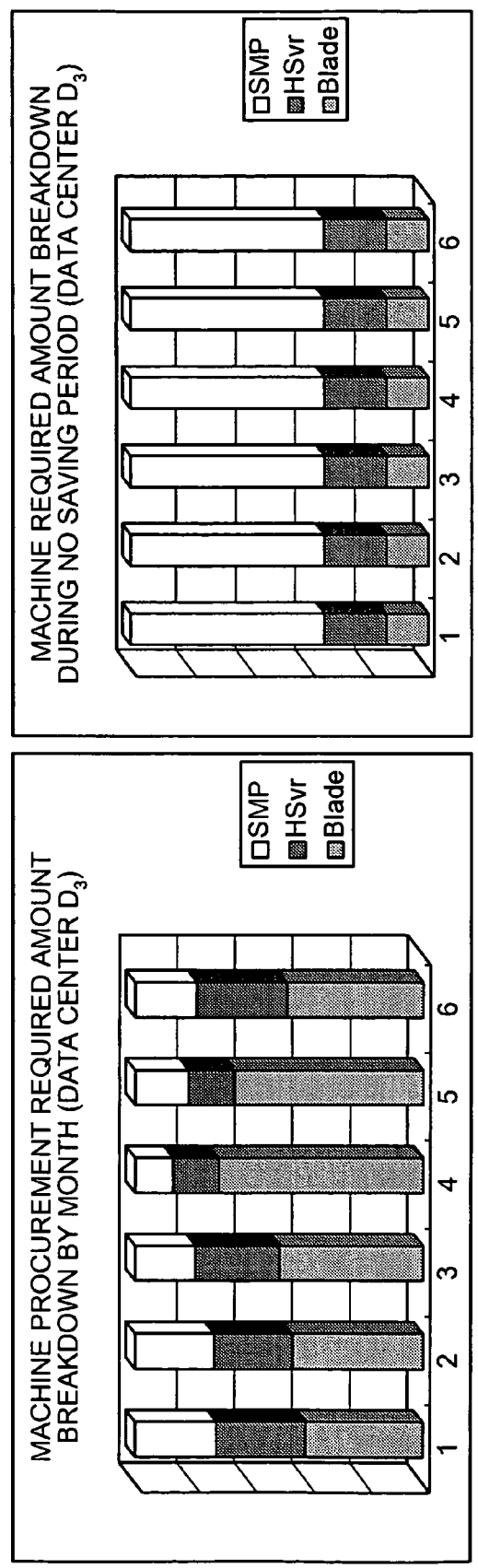
FIG. 18C is a bar chart of a breakdown ratio of an equipment procurement amount among different types of computer hardware in each equipment procurement section in the data center $D_3$.

FIGS. 18A to 18C are bar charts of a breakdown ratio of the equipment procurement amount between types of computer hardware of each equipment procurement section respectively in the data centers $D_1$ to $D_3$. In each of FIGS. 18A to 18C, the horizontal axis represents the equipment procurement sections (January to June) and the vertical axis represents the equipment procurement amount.

In each of FIGS. 18A to 18C, the bar chart on the right shows the breakdown ratio for the types of computer hardware of each equipment procurement section obtained when optimization is executed without considering the compatibility values, and the bar chart on the left shows the breakdown ratio for the types of computer hardware of each equipment procurement section obtained when optimization is executed considering the compatibility values.

Figure 19:
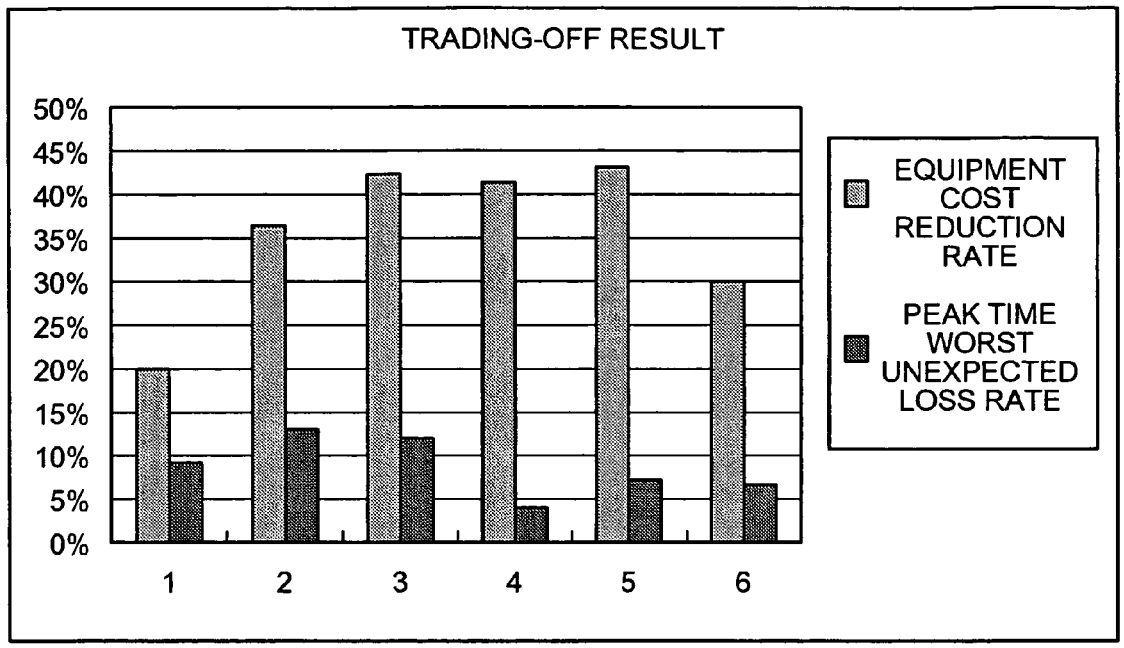
FIG. 19 is a bar chart of a reduction rate of the equipment procurement cost obtained as a result of optimization using a compatibility value (for each equipment procurement section), and a reduction loss rate of throughputs of the data center $D_i$ to be victimized instead of the cost reduction.

FIG. 19 is a bar chart of a reduction rate of the equipment procurement cost (for each equipment procurement section) obtained as a result of the optimization using the compatibility values. In FIG. 19, the horizontal axis represents the equipment procurement sections (January to June) and the vertical axis represents the equipment costs reduction rate of the data center $D_i$ and the peak time worst unexpected loss rate. The peak time worst unexpected loss rate is a bar chart showing the loss rate of victimized portion of the throughput of the data center $D_i$ in stead of the costs reduction at the load peak time during the month.

Figure 20:
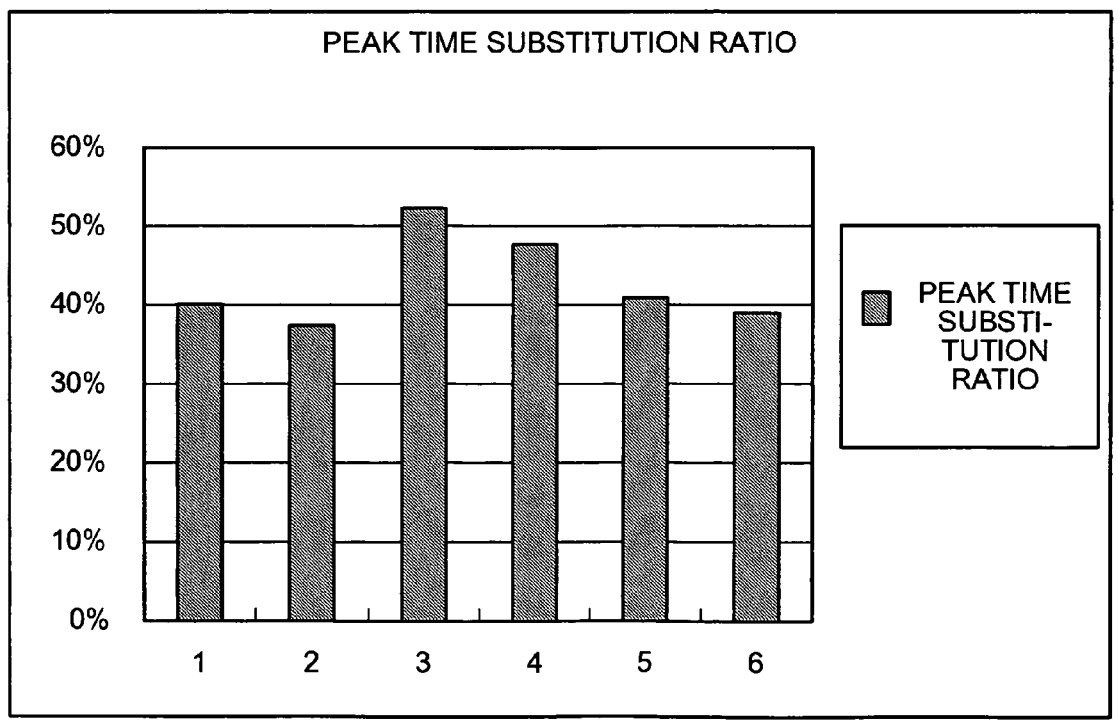
FIG. 20 is a bar chart of a rate of alternative processing of a load that is supposed to be processed by an SMP machine but is actually processed by a blade server.

FIG. 20 is a bar chart of a ratio of alternative processing of a load that is supposed to be processed by the SMP machine but is actually processed by the blade server. In FIG. 20, the horizontal axis represents the equipment procurement sections (January to June) and the vertical axis represents the above substituting ratio.

Figure 21:
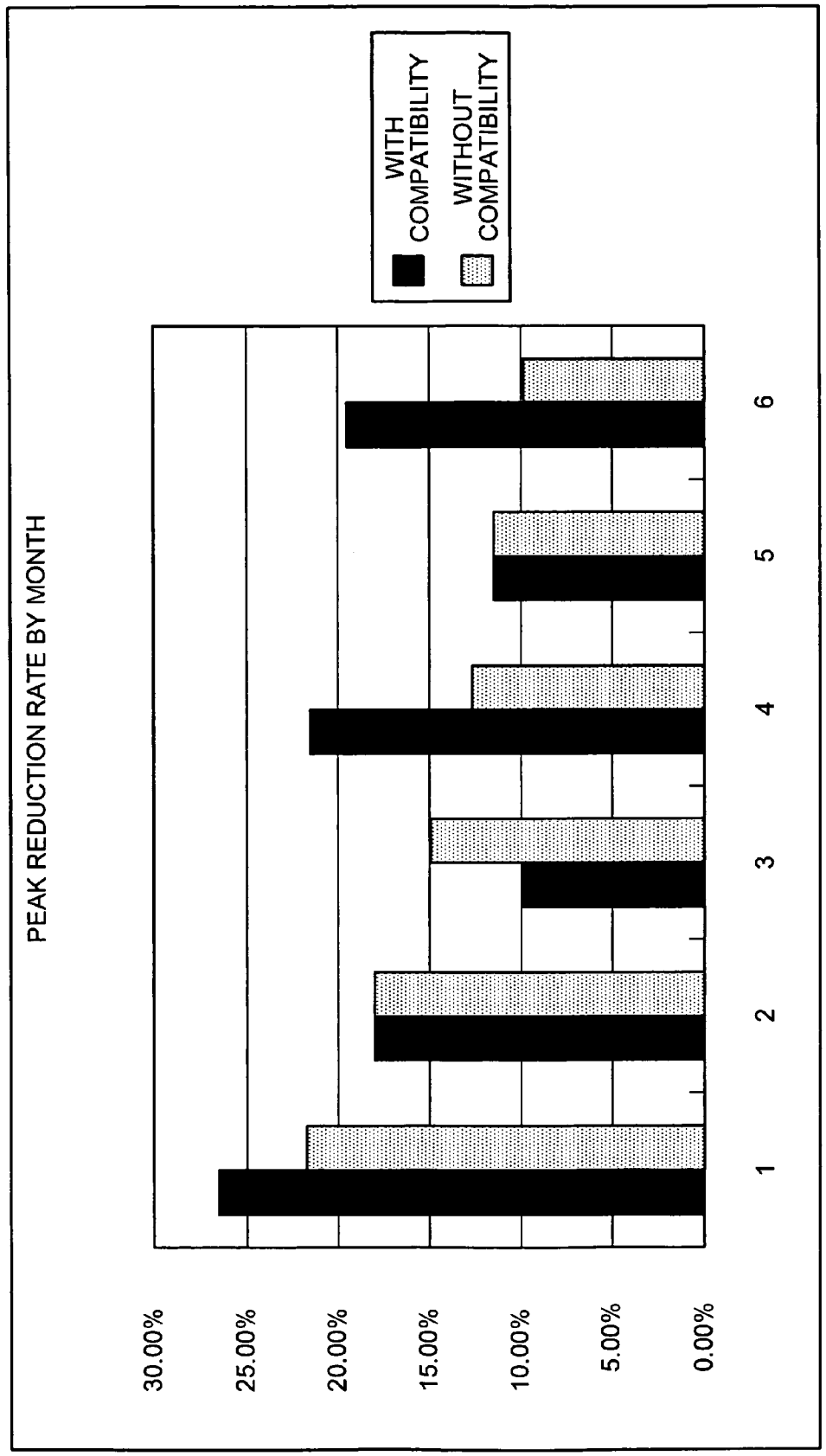
FIG. 21 is a bar chart of a peak reduction rate in each equipment procurement section when a compatibility value is considered and when the compatibility value is not considered.

FIG. 21 is a bar chart showing a peak reduction rate achieved in each equipment procurement section when the compatibility value is considered and when the compatibility value is not considered. In FIG. 21, the horizontal axis represents the equipment procurement sections (January to June) and the vertical axis represents the peak reduction rate of the data center $D_i$.

As described above, according to the embodiment of the present invention, in an environment where a plurality of data centers $D_1$ to $D_3$ each having different types of computer hardware $M_i$mt mixed therein are connected through a wide-area network and a plurality of network services are operated simultaneously by a utility operation scheme, the optimal ratio of the load distribution of the load amount arrived at each network service between the data centers $D_i$, $D_j$, and between the types mt of computer hardware at each time point in the future can be obtained based on the estimation waveform of load fluctuation of each network service.

The necessary computing resources amount that secures the necessary throughput while minimizes the equipment costs of the computer hardware $M_i$mt at each time point in the future, and the costs necessary for procuring this necessary computing resources amount are calculated and the calculated results are lined up in the time sequence. Thus, the optimal operation plan and the optimal equipment procurement plan of the data centers $D_1$ to $D_n$ in the future can be created. Therefore, information beneficial for the operator of the data centers $D_1$ to $D_n$ group.

As described above, according to the resource plan creating program, the recording medium recorded with the program, the resource plan creating apparatus, and the resource plan creating method according to the embodiment of the present invention, higher efficiency of the equipment investment and the equipment costs can be facilitated by realizing correctly the optimization of the resource plan corresponding to the data centers and the tasks.

The resource plan creating method described in the embodiment can be realized by executing a program prepared in advance on a computer such as a personal computer, a work station, etc. This program is recorded in a computer-readable recording medium such as a hard disk, a flexible disk, a CD-ROM, an MO, a DVD, etc., and is executed by being read from the recording medium by the computer. This program may be a transmission medium capable of being distributed through a network such as the Internet, etc.

According to the present invention, efficient equipment investment and equipment cost can be facilitated.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium that stores therein a computer program for realizing a method of creating a resource plan, the computer program making a computer execute:
   acquiring an estimation waveform of load fluctuation and a performance value indicative of a performance of each of a plurality of types of computer hardware in each data center that constitutes a distribution system, the performance when performing a task selected from among a plurality of types of tasks relating to a network service operated by the distribution system;
   calculating a compatibility value indicative of compatibility of a predetermined type of computer hardware with the task based on the performance value, the predetermined type of computer hardware selected from among the types of computer hardware;
   detecting a load fluctuation estimating value at an arbitral time from the estimation waveform of load fluctuation;
   optimizing a value of allocating amount of a computing resource based on compatibility and the load fluctuation estimating value; and
   creating a resource plan of the distribution system based on necessary amount of an equipment procurement in a time slot obtained by totaling the allocating amount of the computing resource.

2. The computer-readable recording medium according to claim 1, wherein the compatibility value is a value of which a denominator is a highest value acquired at the acquiring, and a numerator is each performance value acquired at the acquiring.

3. The computer-readable recording medium according to claim 1, wherein
   the optimizing includes optimizing a first objective function for calculating a rate of satisfaction of a resource demand amount relating to the predetermined type of computer hardware such that the rate is maximized, using the compatibility value, the allocation amount of computing resources for the task, a load amount of the task, and an amount of computing resources required for processing the task, and
   the creating includes creating the resource plan using an optimal solution obtained when the first objective function is optimized.

4. The computer-readable recording medium according to claim 3, wherein
   the optimizing includes further optimizing a second objective function for calculating an equipment procurement cost of the predetermined type of computer hardware such that the equipment procurement cost is minimized, using the allocation amount and a purchase unit price of the predetermined type of computer hardware, and
   the creating includes creating the resource plan further using an optimal solution obtained when the second objective function is optimized.

5. The computer-readable recording medium according to claim 4, wherein the optimizing includes further optimizing a third objective function for calculating a load uniformity of the load amount of the task among data centers such that the load uniformity is minimized; and
   the creating includes creating the resource plan further using an optimal solution obtained when the third objective function is optimized.

6. The computer-readable recording medium according to claim 4, wherein the optimizing includes further optimizing a third objective function for calculating a distribution appropriateness of the load amount of the task among data centers such that the distribution appropriateness is maximized; and
   the creating includes creating the resource plan further using an optimal solution obtained when the third objective function is optimized.

7. The computer-readable recording medium according to claim 5, wherein the optimizing includes further optimizing a fourth objective function for calculating a distribution appropriateness of the load amount of the task among data centers such that the distribution appropriateness is maximized; and
   the creating includes creating the resource plan further using an optimal solution obtained when the fourth objective function is optimized.

8. The computer-readable recording medium according to claim 3, wherein an aspiration level method is used at the optimizing.

9. The computer-readable recording medium according to claim 3, wherein the resource plan includes information on a procurement budget for the computer hardware, equipment addition timing, and a quantity of equipment to be procured.

10. The computer-readable recording medium according to claim 3, wherein
    the computer program further makes the computer execute:
       calculating an inter-type load distribution ratio between the predetermined type of computer hardware and another type of computer hardware, using the optimal solution; and
       optimizing an estimation waveform of load fluctuation of the network service using the inter-type load distribution ratio, and
       the creating includes creating the resource plan based on optimized estimation waveform.

11. An apparatus for creating a resource plan, comprising:
    an acquiring unit configured to acquire an estimation waveform of load fluctuation and a performance value indicative of a performance of each of a plurality of types of computer hardware in each data center that constitutes a distribution system, the performance when performing a task selected from among a plurality of types of tasks relating to a network service operated by the distribution system;
    a calculating unit configured to calculate a compatibility value indicative of compatibility of a predetermined type of computer hardware with the task based on the performance value, the predetermined type of computer hardware selected from among the types of computer hardware;
    a detecting unit configured to detect a load fluctuation estimating value at an arbitral time from the estimation waveform of load fluctuation;

an optimizing unit configured to optimizing a value of allocating amount of a computing resource based on compatibility and the load fluctuation estimating value; and a creating unit configured to create a resource plan of the distribution system based on necessary amount of an equipment procurement in a time slot obtained by totaling the allocating amount of the computing resource.

12. A method of creating a resource plan, comprising:

acquiring an estimation waveform of load fluctuation and a performance value indicative of a performance of each of a plurality of types of computer hardware in each data center that constitutes a distribution system, the performance when performing a task selected from among a plurality of types of tasks relating to a network service operated by the distribution system;

calculating a compatibility value indicative of compatibility of a predetermined type of computer hardware with the task based on the performance value, the predetermined type of computer hardware selected from among the types of computer hardware;

detecting a load fluctuation estimating value at an arbitral time from the estimation waveform of load fluctuation;

optimizing a value of allocating amount of a computing resource based on compatibility and the load fluctuation estimating value; and creating a resource plan of the distribution system based on necessary amount of an equipment procurement in a time slot obtained by totaling the allocating amount of the computing resource.

* * * * *